(12) United States Patent
Thurber et al.

(10) Patent No.: US 9,529,200 B2
(45) Date of Patent: Dec. 27, 2016

(54) METHOD AND SYSTEM FOR REDUCING MOTION BLUR WHEN EXPERIENCING VIRTUAL OR AUGMENTED REALITY ENVIRONMENTS

(71) Applicant: Ion Virtual Technology Corporation, Boise, ID (US)

(72) Inventors: Daniel Thurber, Boise, ID (US); Jorrit Jongma, Geldrop (NL); Von Ertwine, Upper Holland, PA (US)

(*) Notice: Subject to any disclaimer, the term of this patent is extended or adjusted under 35 U.S.C. 154(b) by 0 days.

(21) Appl. No.: 14/859,287

(22) Filed: Sep. 19, 2015

(65) Prior Publication Data

US 2016/0011424 A1    Jan. 14, 2016

Related U.S. Application Data

(63) Continuation-in-part of application No. 14/641,411, filed on Mar. 8, 2015.
(Continued)

(51) Int. Cl.
| | | |
|---|---|---|
| *G02B 27/14* | (2006.01) | |
| *G09G 5/00* | (2006.01) | |

(Continued)

(52) U.S. Cl.
CPC ......... *G02B 27/0176* (2013.01); *G02B 27/017* (2013.01); *G02B 27/0172* (2013.01);
(Continued)

(58) Field of Classification Search
CPC ... G02B 27/01; G02B 27/017; G02B 27/0172; G02B 27/0176; G02B 27/14; G02B 27/64; G02B 2027/011; G02B 2027/0118; G02B 2027/0134; G02B 2027/0138; G02B 2027/0154; G02B 2027/0156; G02B 2027/014; G02B 2027/0178; G02B 2027/0187; G06F 3/01; G06F 3/011; G06F 3/012; G06F 3/013; G06F 3/014; H04N 7/142; H04N 7/15; H04N 21/4126; H04N 21/431; G09G 5/00; G06T 19/006
(Continued)

(56) References Cited

U.S. PATENT DOCUMENTS

| | | | |
|---|---|---|---|
| 5,003,300 A | 3/1991 | Wells | |
| 5,422,684 A | 6/1995 | Keller | |

(Continued)

FOREIGN PATENT DOCUMENTS

| | | |
|---|---|---|
| EP | 2765777 | 8/2014 |
| JP | 08125948 | 5/1996 |

(Continued)

OTHER PUBLICATIONS

Korean Intellectual Property Office, International Search Report and Written Opinion of the International Search Authority for PCT/US2015/061513, Mar. 3, 2016.

(Continued)

*Primary Examiner* — Loha Ben
(74) *Attorney, Agent, or Firm* — Whitley Legal Group, P.C.; AnnMarie W. Whitley

(57) ABSTRACT

A system or apparatus for reducing motion blur includes an active shutter system, shutter control and processing components, an optional optical sensor, one or more optional movement sensors, and a power source, and can cooperate with a virtual or augmented reality system and display. The shutter system is optimally positioned between a user and the display so that one or more shutters of the system can be activated to block a user's view of the display. The shutter system is activated to block refresh lines or other artifacts present when the display refreshes. The shutter system also can be activated according to movement of the user. The shutter system can be one or more independent shutters and (Continued)

each shutter can have one or more shutter segments. Additionally, the shutter system can include multiple cooperating layers of shutters. The shutter system further can be incorporated in a multi-lens optical system.

20 Claims, 24 Drawing Sheets

Related U.S. Application Data

(60) Provisional application No. 62/082,386, filed on Nov. 20, 2014, provisional application No. 61/950,651, filed on Mar. 10, 2014, provisional application No. 61/994,544, filed on May 16, 2014.

(51) Int. Cl.
| | |
|---|---|
| G02B 27/01 | (2006.01) |
| G06F 3/01 | (2006.01) |
| G06T 19/00 | (2011.01) |
| G02B 27/64 | (2006.01) |
| H04N 21/41 | (2011.01) |

(52) U.S. Cl.
CPC .............. *G02B 27/64* (2013.01); *G06F 3/011* (2013.01); *G06F 3/012* (2013.01); *G06T 19/006* (2013.01); *G09G 5/00* (2013.01); *G02B 2027/011* (2013.01); *G02B 2027/014* (2013.01); *G02B 2027/0134* (2013.01); *G02B 2027/0138* (2013.01); *G02B 2027/0154* (2013.01); *G02B 2027/0156* (2013.01); *G02B 2027/0178* (2013.01); *H04N 21/4126* (2013.01)

(58) Field of Classification Search
USPC ........ 359/630, 632, 633, 462; 345/7–9, 633; 348/38
See application file for complete search history.

(56) References Cited

U.S. PATENT DOCUMENTS

| | | | |
|---|---|---|---|
| 6,160,666 A | 12/2000 | Rallison et al. | |
| 6,388,797 B1 | 5/2002 | Lipton et al. | |
| 6,963,379 B2 | 11/2005 | Tomono | |
| 8,333,417 B2 | 12/2012 | Bannasch et al. | |
| 8,599,248 B2 | 12/2013 | Kim et al. | |
| 8,605,008 B1 | 12/2013 | Prest et al. | |
| 8,711,462 B1 | 4/2014 | Kaiser et al. | |
| 8,848,006 B2 | 9/2014 | Wetzstein et al. | |
| 8,924,985 B2 | 12/2014 | Yoo et al. | |
| 8,937,592 B2 | 1/2015 | Marti et al. | |
| 8,941,559 B2 * | 1/2015 | Bar-Zeev | G02B 26/026 345/204 |
| 8,941,787 B2 | 1/2015 | Lee et al. | |
| 8,957,835 B2 | 2/2015 | Hoellwarth | |
| 8,964,298 B2 * | 2/2015 | Haddick | G06F 3/013 359/630 |
| 9,230,473 B2 * | 1/2016 | Margolis | G09G 3/3208 |
| 9,323,325 B2 * | 4/2016 | Perez | H04N 13/0278 |
| 2001/0038361 A1 | 11/2001 | Tanijiri et al. | |
| 2002/0163486 A1 | 11/2002 | Ronzani et al. | |
| 2009/0027616 A1 | 1/2009 | Sheldon | |
| 2010/0079356 A1 | 4/2010 | Hoellwarth | |
| 2010/0277575 A1 | 11/2010 | Ismael et al. | |
| 2011/0051074 A1 | 3/2011 | Arnell | |
| 2011/0199470 A1 | 8/2011 | Moller et al. | |
| 2011/0234774 A1 | 9/2011 | Satoh et al. | |
| 2011/0292191 A1 | 12/2011 | MacNaughton et al. | |
| 2012/0127284 A1 | 5/2012 | Bar-Zeev et al. | |
| 2013/0076998 A1 | 3/2013 | Kakinuma et al. | |
| 2013/0120706 A1 | 5/2013 | Kakinuma et al. | |
| 2013/0300766 A1 | 11/2013 | Mukawa | |
| 2014/0111610 A1 | 4/2014 | Ha et al. | |
| 2014/0375679 A1 | 12/2014 | Margolis et al. | |
| 2015/0035880 A1 | 2/2015 | Heide et al. | |
| 2015/0348327 A1 | 12/2015 | Zalewski | |
| 2016/0011422 A1 * | 1/2016 | Thurber | G02B 27/64 345/8 |
| 2016/0011423 A1 * | 1/2016 | Thurber | G02B 27/64 345/8 |
| 2016/0011425 A1 | 1/2016 | Thurber et al. | |
| 2016/0019720 A1 | 1/2016 | Thurber et al. | |

FOREIGN PATENT DOCUMENTS

| | | |
|---|---|---|
| JP | 2004029768 | 1/2004 |
| JP | 5030595 B2 | 9/2012 |
| JP | 2013033172 A | 2/2013 |
| JP | 2014010326 | 1/2014 |
| KR | 1020000050024 A | 8/2000 |
| KR | 1020050048263 B1 | 5/2005 |

OTHER PUBLICATIONS

Korean Intellectual Property Office, International Search Report and Written Opinion of the International Search Authority for PCT/US2015/019340, May 29, 2015.
Korean Intellectual Property Office, International Search Report and Written Opinion of the International Search Authority for PCT/US2015/040402, Oct. 30, 2015.
Korean Intellectual Property Office, International Search Report and Written Opinion of the International Search Authority for PCT/US2015/066410, Apr. 8, 2016.
Parnes, Peter, Head Mounted Dspaly and PDA, http://www.parnes.com/blog/2003/03/head-mounted-display-and-pda.html, Mar. 23, 2003.
Pak, Jae, Entry 11, The Gadgeteer "Only in Your Dreams" PDA Contest, http://static.the-gadgeteer.com/dreampda-contest-entries.html, May 2001.
Blass, Evan, Engadget.com; http://www.engadget.com/2005/09/15/metal-gear-acid-2-for-psp-to-ship-with-solid-eye-gaming/, Sep. 15, 2005.
U.S. Appl. No. 14/641,411, filed Mar. 8, 2015, Thurber, Daniel.
U.S. Appl. No. 14/859,286, filed Sep. 19, 2015, Thurber, Daniel.
U.S. Appl. No. 14/859,287, filed Sep. 19, 2015, Thurber, Daniel.
U.S. Appl. No. 14/859,289, filed Sep. 19, 2015, Thurber, Daniel.
U.S. Appl. No. 14/859,290, filed Sep. 19, 2015, Thurber, Daniel.
U.S. Appl. No. 14/945,704, filed Nov. 19, 2015, Thurber, Daniel.

* cited by examiner

FIG. 17
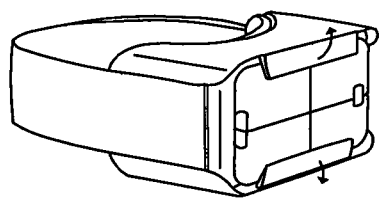 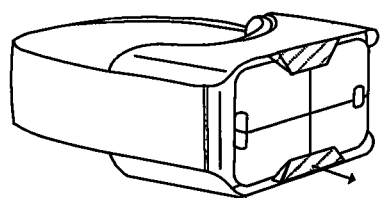
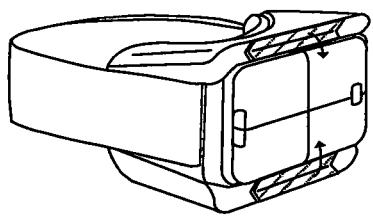 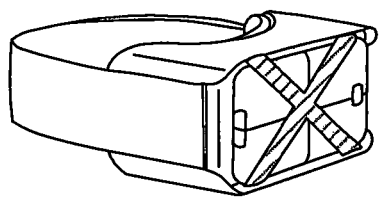
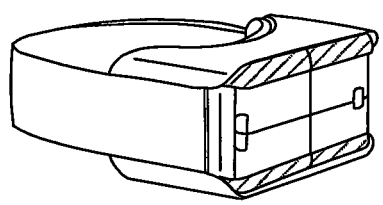 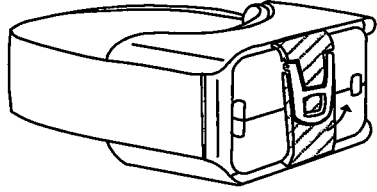
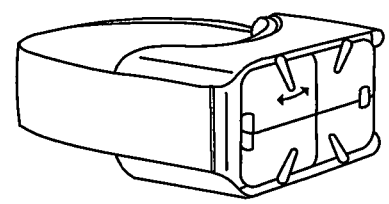 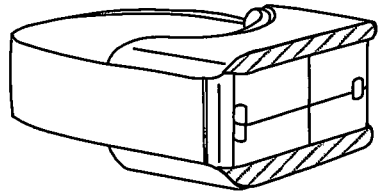
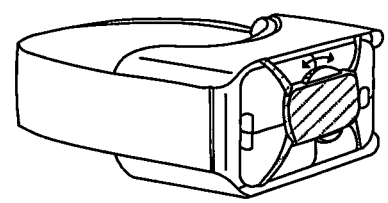 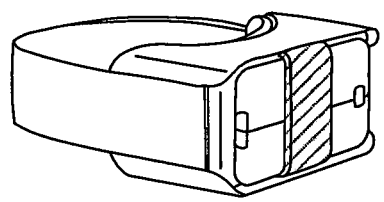
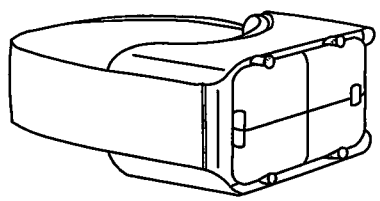

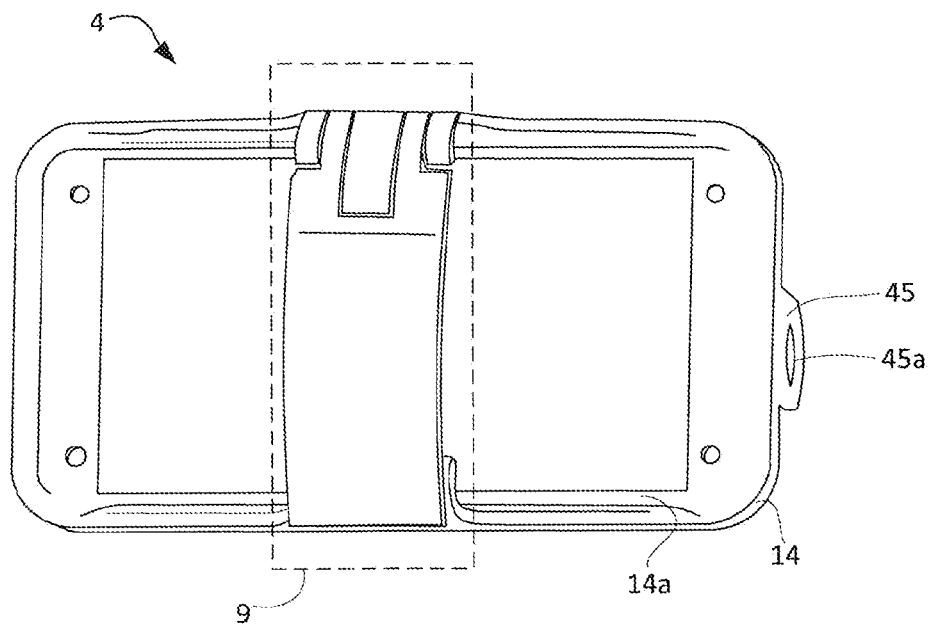
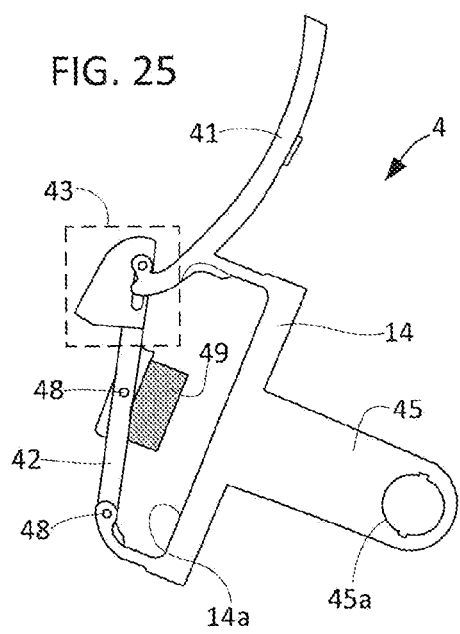
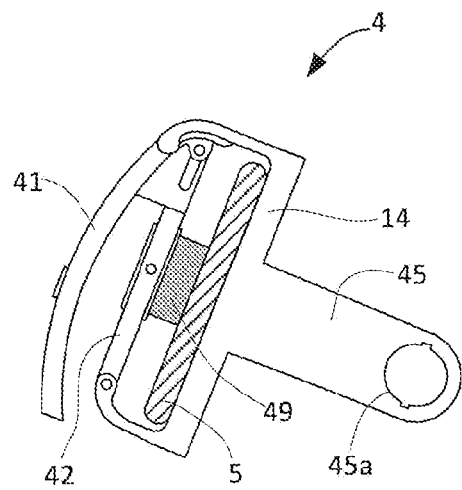

METHOD AND SYSTEM FOR REDUCING MOTION BLUR WHEN EXPERIENCING VIRTUAL OR AUGMENTED REALITY ENVIRONMENTS

CROSS-REFERENCE TO RELATED APPLICATIONS

This application claims the benefit of provisional U.S. Application 62/082,386 filed Nov. 20, 2014 and co-pending U.S. application Ser. No. 14/641,411 filed Mar. 8, 2015, which claims the benefit of provisional U.S. Application No. 61/950,651 filed Mar. 10, 2014 and provisional U.S. Application No. 61/994,544 filed May 16, 2014.

FIELD OF INVENTION

This invention relates to virtual reality environments. More particularly, this device relates to a method and apparatus for reducing motion blur when viewing or experiencing three-dimensional content using a virtual reality or augmented reality system.

BACKGROUND

Virtual reality (VR) and augmented reality (AR) systems are gaining in popularity and providing useful for many applications including gaming, entertainment, advertising, architecture and design, medical, sports, aviation, tactical, engineering, and military applications. Most VR and AR systems use personal computers with powerful graphics cards to run software and display the graphics necessary for enjoying an advanced virtual environment. To display virtual reality environments, many systems use head-mounted displays (HMDs).

Many HMDs include two displays, one for each eye, to create a stereoscopic effect and give the illusion of depth. HMDs also can include on-board processing and operating systems such as Android to allow application to run locally, which eliminates any need for physical tethering to an external device. Sophisticated HMDs incorporate positioning systems that track the user's head position and angle to allow a user to virtually look around a VR or AR environment simply by moving his head. Sophisticated HMDs may also track eye movement and hand movement to bring additional details to attention and allow natural interactions with the VR or AR environment.

While traditional HMDs include dedicated components, interest is growing to develop an HMD that incorporates a user's own mobile device such as smart phones, tablets, and other portable or mobile devices having video displays. In order to create an immersive VR or AR environment, however, the HMD should be sized, configured, and constructed in specific way for use with a particular mobile device. Additionally, in order to create an immersive VR or AR environment, the single traditional display on the mobile device must be converted to a stereoscopic display.

One particular problem with stereoscopic displays of VR or AR systems, traditional HMDs, and HMDs that incorporate mobile devices with video displays is motion blur, which is the apparent streaking of rapidly moving objects in the three-dimensional video. Motion blur is further exacerbated by head movement. Current VR systems, AR systems, and HMDs fail to provide an effective way of reducing motion blur. Accordingly, it would be desirable to provide an apparatus that can be incorporated in or included as a component of VR or AR systems in general and of HMD or VR/AR headsets in particular to reduce motion blur. Moreover, it would be desirable to provide a method of using the apparatus to reduce motion blur while viewing three-dimensional video.

SUMMARY OF THE INVENTION

An apparatus for reducing motion blur experienced by participants in virtual reality (VR) or augmented reality (AR) environments comprises an active shutter system, shutter control and processing components, an optional optical sensor, one or more optional movement sensors such as accelerometers, magnetometers, and gyroscopes, and a power source, each of which cooperates with a VR or AR system. For purposes of this invention, references to VR systems is understood to also include AR systems as well. The VR system comprises one or more displays, one or more lenses, and access to VR control and processing components. The VR system optionally further comprises a head mounted display or a head mounted display frame that accommodates a mobile device. The active shutter system is positioned near the lenses or displays such that it is directly in the line of sight of the user when using the VR system and watching the displays, or it will be incorporated into a multi-part lens system and, for example, placed between a first plastic or glass lens and a second plastic or glass lens. Preferably, the overall size of the active shutter system is such that the entire display area or the user's or participant's entire field of view can be covered with the active shutter system. Where the VR system or headset system comprises only one display, preferably the single display is converted to a stereoscopic display by executing software stored remotely or locally that generates two adjacent smaller displays within the original display. The control and processing components of the apparatus or of the cooperating VR system include hardware and software for executing a method of controlling the active shutters while a user views a three-dimensional video on the displays. The optional optical sensor or sensors are positioned adjacent to or near the display such that characteristics of the displayed content and the display itself can be recorded or measured for further use by the hardware and software for executing a method of controlling the active shutters while a user views a three-dimensional video on the displays. The optional motion sensors are preferably positioned on a component that is positioned on the viewer's or participant's head such as somewhere on a HMD so that they can account for the user's head motion to enhance the method of controlling the active shutters.

To use the apparatus for reducing motion blur with a VR headset, the active shutter system should be physically positioned between the participant's eyes and the displays such that the participant's field of view of the display area cooperates with the active shutter system, and the active shutter should be in direct or wireless communication with the shutter computing components and power source. Preferably, the participant positions his first eye so that it cooperates with the first lens and his second eye so that it cooperates with the second lens and then simultaneously views the first display through a first lens and the second display through a second lens. While the user views video on the display, individual shutter cells of the active shutter system are activated according to either a given shutter engagement pattern and the refresh rate of the displays or an optimized shutter engagement pattern that adapts according to data sensed by the optional optical sensor, the optional motion sensors, or both.

BRIEF DESCRIPTION OF THE DRAWINGS

FIG. 17 is an illustration of examples of locks appropriate for use with the virtual reality headset of the present invention.

FIG. 24 is a front view of the device module of the fifth embodiment of the virtual reality headset of the present invention.

FIG. 25 is a side view of the device module and an open lock of the fifth embodiment of the virtual reality headset of the present invention.

FIG. 26 is a side view of a mobile device positioned in the device module of the fifth embodiment of the virtual reality headset of the present invention.

DETAILED DESCRIPTION OF THE INVENTION

Figure 1:
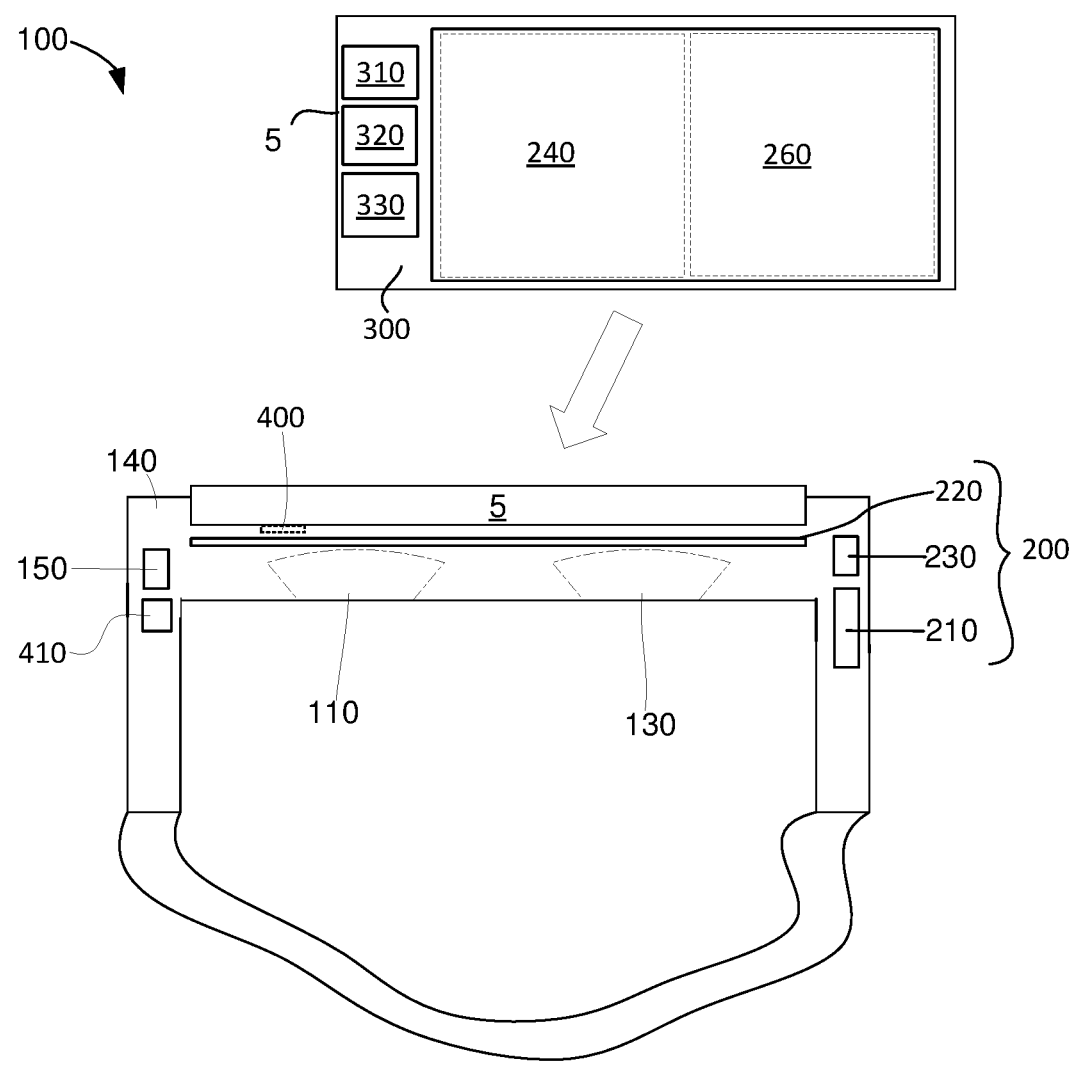
FIG. 1 is a top schematic view of the components of a virtual reality headset system that incorporates a mobile device and an active shutter system.

As shown in FIG. 1, an apparatus 200 for reducing motion blur experienced by a participant in virtual or augmented reality cooperates with a virtual reality (VR) headset system 100. For purposes of this invention, a VR system is understood to include both VR systems and augmented reality (AR) systems, and the terms user, viewer, and participant are used interchangeably. The apparatus 200 for reducing motion blur comprises an active shutter system 220, shutter control and processing components 230, an optional optical sensor 400, one or more optional motion sensors 410, and a power source 210. The cooperating VR headset system 100 shown in FIG. 1 is preferably modular and comprises a head mounted display (HMD) frame 140, lenses 110 and 130, VR control and processing components 150, a mobile device 5 with display 300 and effective stereoscopic displays 240 and 260, and access to VR control and processing components 150 for operating or cooperating with the mobile device display. The HMD frame 140 houses or attaches to lenses 110 and 130 and houses or attaches to VR control and processing components 150. Preferably, HMD frame further defines slots or openings to accommodate the active shutter system 220, the shutter control and processing components 230, and the power source 210 where needed. Frame can be any type of headwear suitable for positioning attached lenses near the user's eyes as is well known in the art. Lenses can be any type of lenses suitable for viewing displays at a very close distance as is also well known in the art. For example, lenses with a 5× or 6× magnification are suitable. Additionally, lenses may be multi-part lenses with several optically cooperating lens components.

The shutter control and processing components 230 comprise any control and processing components such as discrete circuits desirable or necessary to drive the active shutter system or necessary to coordinate the use of the active shutter system with the video being displayed and the components of the cooperating VR headset system. The VR computing components 150 comprise any control and processing components such as discrete circuits desirable or necessary to use the headset for a virtual reality experience and to cooperate with mobile device 5. The VR control and processing components 150 and the shutter control and processing components 230 can be two separate sets of components that communicate wirelessly or directly, or they can be combined for efficiency. For example, VR control and processing components 150 may include control circuitry, input devices, sensors, and wireless communication components. VR control and processing components 150 and shutter control and processing components 230 can include independently or in combination any combination of computer components such as, for example, a processor programmed to operate in various modes and additional elements of a computer system such as, memory, storage, an input/output interface, a waveform or pulse generator, photodiodes, phototransistors, photo resistors, a communication interface, and a bus, as is well known in the art. Preferably, shutter control and processing components further comprise code or software and hardware for executing a method of driving the active shutter system while a user views a three dimensional video on the displays. Preferably, the software or code is stored in the memory and executable by the processor of the control and processing components.

FIG. 1 also illustrates how mobile device 5 physically cooperates with HMD frame 140. HMD frame 140 preferably attaches to or alternatively is positioned adjacent to one side of mobile device 5 such that a user can view the display of mobile device 5 when looking through lenses 110 and 130 and through the active shutter system 220. Mobile device 5 preferably is hand-held and includes the typical components of a hand-held mobile device such as a display 300 that forms a surface of the mobile device, a processor 310, memory 320, and wireless communication components 330 as is well known in the art. Optionally and preferably, mobile device 5 also comprises conversion code or software that is stored on the memory 320 and executable by the processor 310 to convert the traditional mobile device display 300 to adjacent effective first and second displays 240 and 260. Alternatively, mobile device 5 can access through a wireless or wired communication link display conversion code that is stored remotely. Preferably, first and second displays 240 and 260 can play the same content or output as was available on or intended for the original display 300 or they can display different content or output as was available on or intended for the original display 300. Additionally, first and second displays 240 and 260 can simultaneously display the same or different content as each other. While a modular VR headset that cooperates with a mobile device is described herein and shown in the features, the apparatus 200 of the present invention can be incorporated into any VR or AR headset design including ones with a permanent and dedicated display or displays and can be incorporated with any VR or AR system, such as a large or small standalone display.

Figure 2:
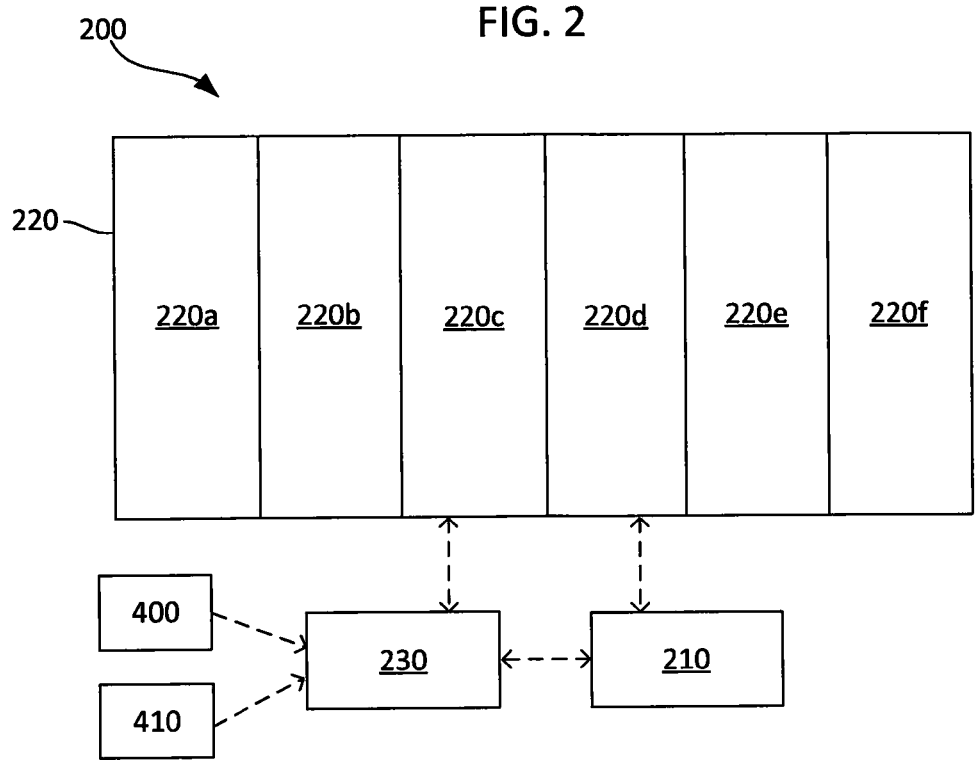
FIG. 2 is an illustration of the active shutter system of the present invention with multiple shutter segments.
Figure 3:
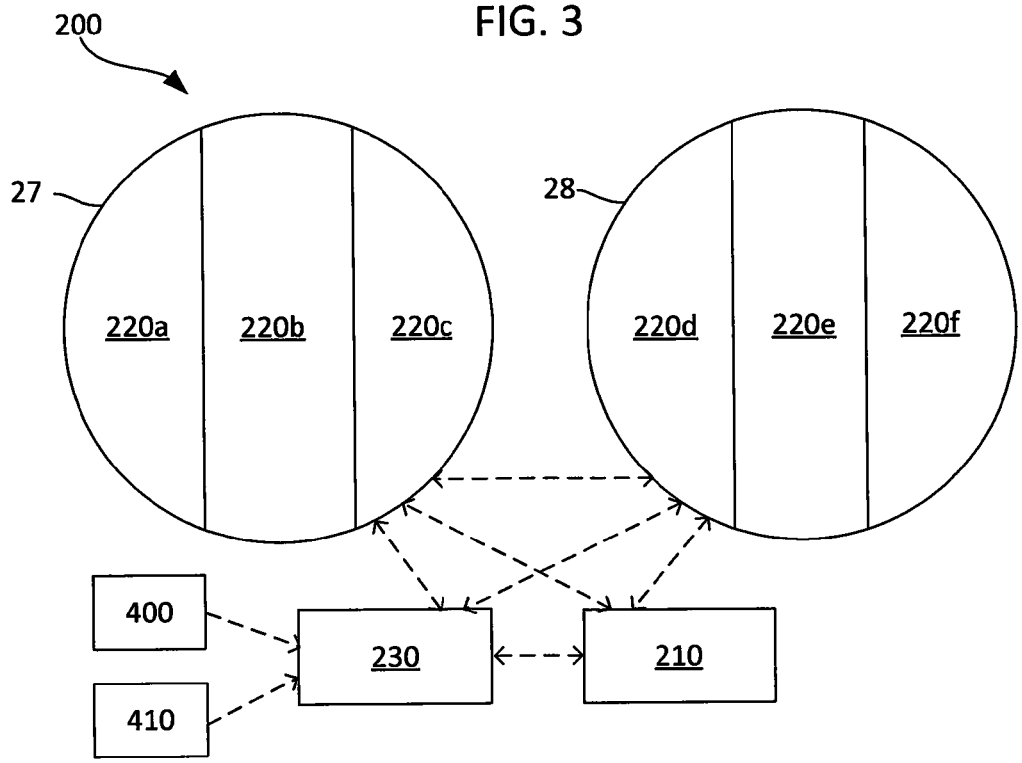
FIG. 3 is an illustration of an alternate embodiment of the active shutter system of the present invention with multiple shutter segments.
Figure 16:
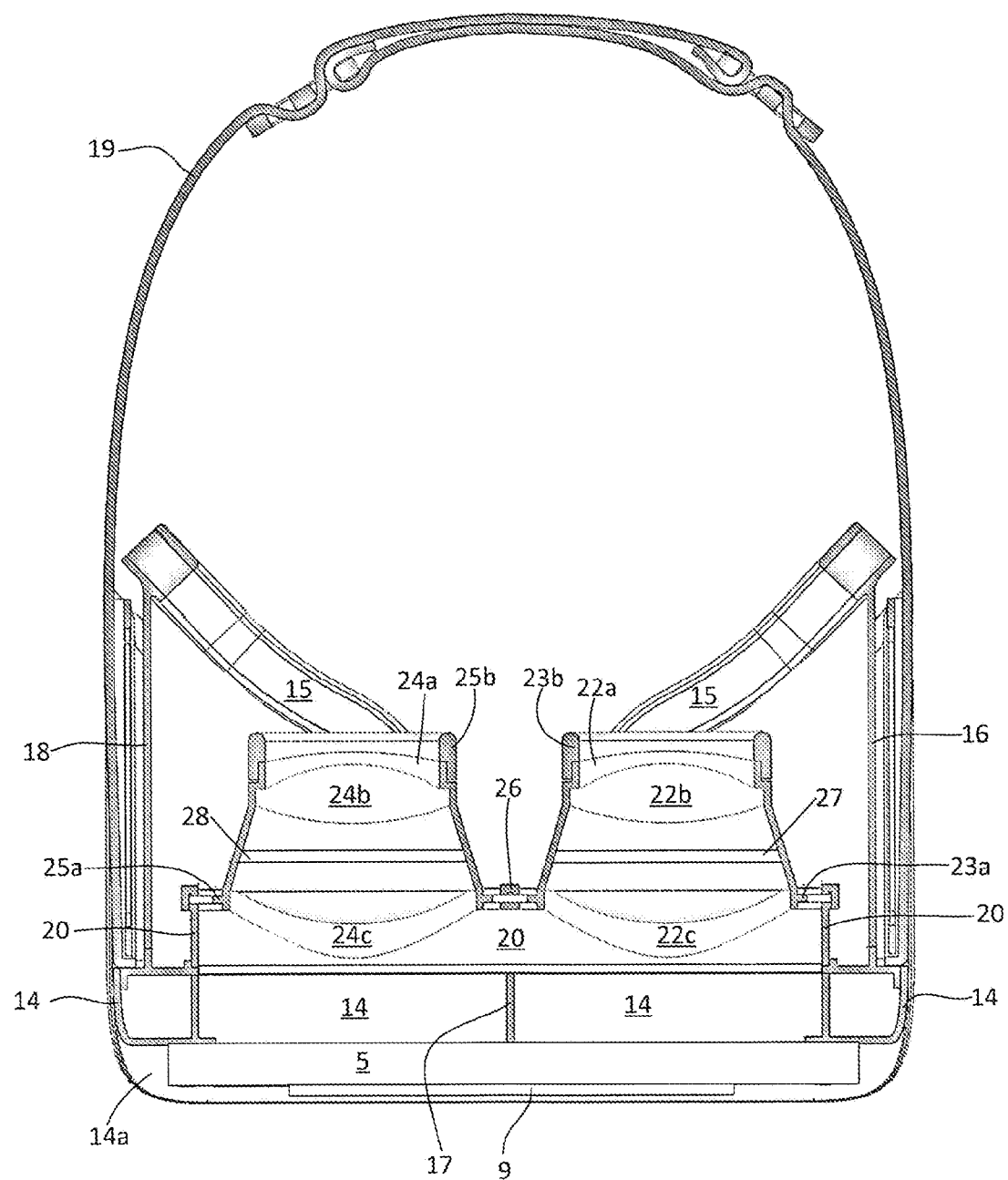
FIG. 16 is a top cutaway view of the fourth embodiment of the virtual reality headset of the present invention that illustrates a lens system of the present invention.
Figure 18:
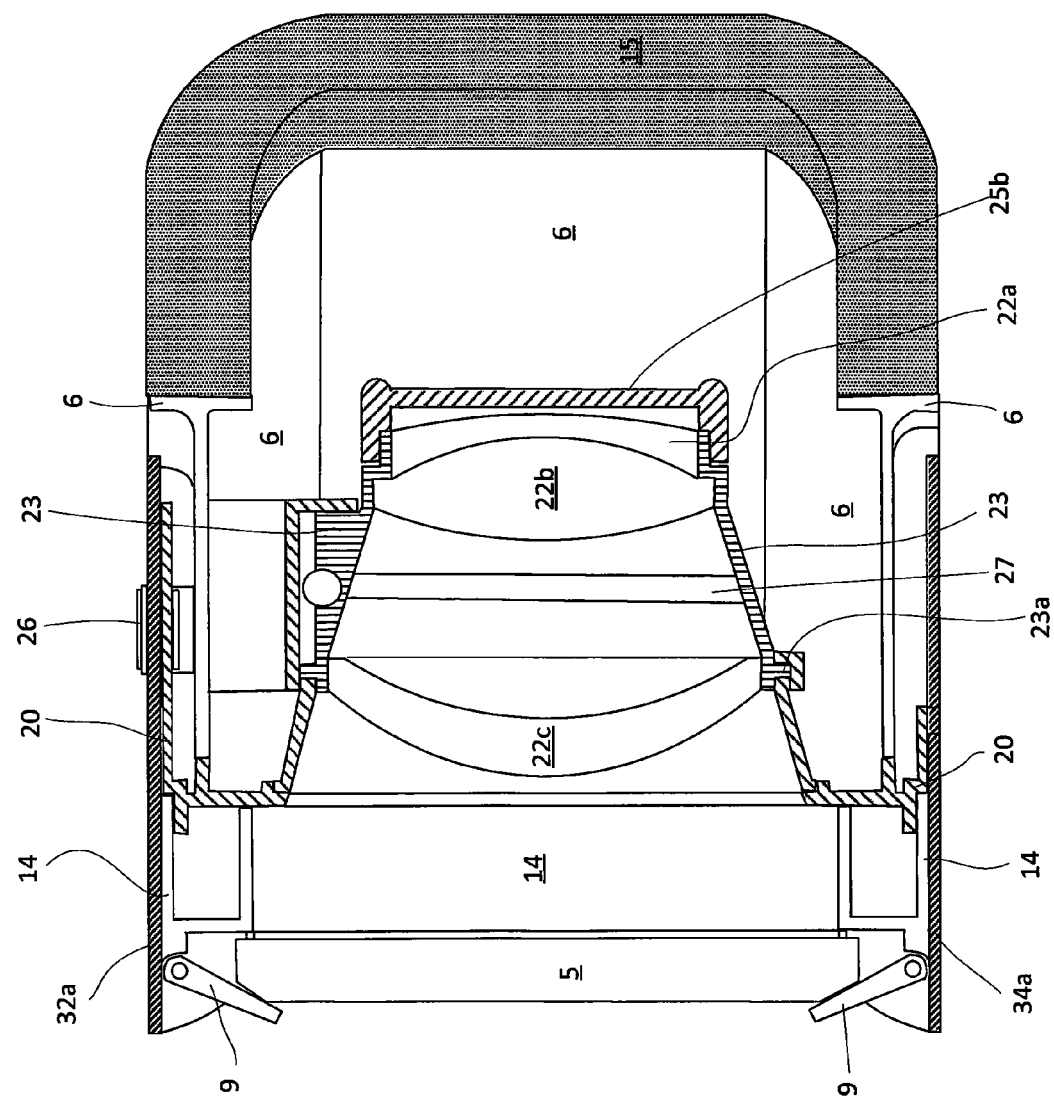
FIG. 18 is a cutaway view of the fourth embodiment of the virtual reality headset of the present invention that illustrates the preferred lens system of the present invention.

For use with a VR headset system, the active shutter system 220 preferably is a modular component that can be added to the VR headset when desired. For example, it can be configured as a screen that can be inserted between the lenses and the mobile device display as shown in FIG. 1. FIG. 2 illustrates the active shutter system 220 as a single component for covering the entire display. It can be inserted into a slot or opening defined by the frame 14, or it can be placed immediately adjacent to the mobile device display 30 such as, and optionally in the same manner as, an electrostatic screen protector. Alternatively, it can be two components 27 and 28 where each component is secured to one of the lenses such that it is positioned between a user's eye and the lens when in use as shown in FIGS. 13-14, 19, and 21 or where each component is positioned between a first and second lens component of a multi-part lens for each eye as shown in FIGS. 16 and 18. FIG. 3 illustrates the active shutter system 220 when split into two components for attaching directly to the lenses. Finally, the active shutter system 220 can be incorporated into the display in some cases such that the display glass is covered by one or more polarized layers, which are the shutters, and then is further covered by another layer of glass. The active shutter system 220 can snap, screw, clip, or adhere to adjacent components. Additionally, the active shutter system 220 establishes an electrical connection or other connection with the shutter control and processing components 230 when it is physically placed in its desired location.

Figure 4:
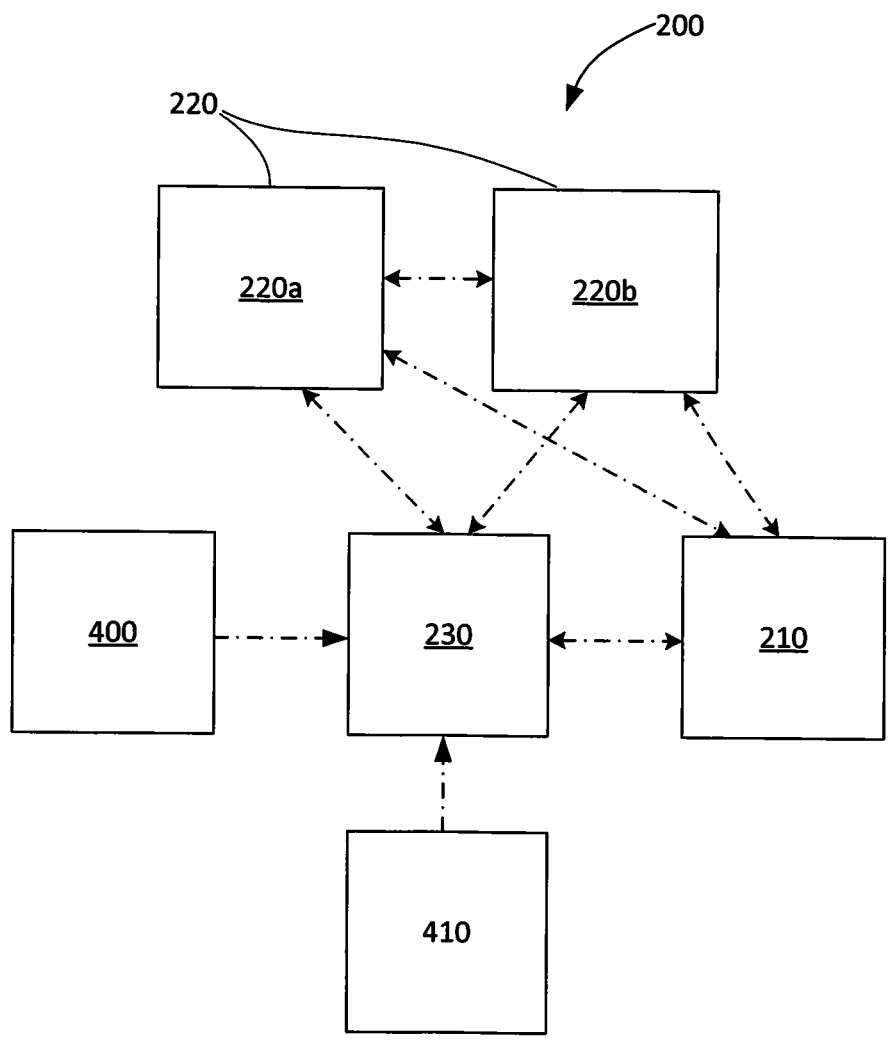
FIG. 4 is an illustration of the preferred embodiment of the active shutter system of the present invention with multiple shutter segments, optical sensors, and motion sensors.

The active shutter system 220 preferably connects to a battery or power source 210 that can also be positioned on or in the headset as needed. Alternatively, it can be powered from the output of the universal serial bus (USB) of the mobile device or by a power source for the headset. The power source 210, shutter control and processing components 230, and active shutter system 220 are all directly or wirelessly connected as shown by the dashed arrows in FIGS. 2, 3, and 4 and the optional optical sensor 400 is also directly or wirelessly connected to the control and processing components 230 as shown in FIG. 4. Similarly, the optional motion sensors 410 such as an accelerometer, magnetometer, and/or gyroscope are also directly or wirelessly connected to the control and processing components as shown in FIG. 4.

The active shutter system 220 preferably comprises any high speed LCD video shutter. For example, shutter system 220 can be twisted nematic liquid crystal displays (LCDs) such as TN cell LCDs or Pi cell LCDs that can be pulsed between and active (on) and inactive (off) state by a waveform generator. Preferably when the shutter is active (on), the cell does not allow light to pass through. When inactive (off), the cell allows light to pass through. The cells can be shuttered on and off at a rate of 0-1200 Hz. Preferably, the cells are shuttered on and off at a rate that matches the output of the video being experienced. More preferably, the cells are shuttered on and off according to the rate and refresh pattern of the content being experienced on the display delivering the content. A method of determining a shutter engagement pattern is detailed below.

The active shutter system 220 illustrated in FIGS. 2, 3, and 4 preferably comprises one or more shutter cells or segments where a multiple cells or segments are part of a single component yet individually electronically controlled. As shown in FIG. 2, the active shutter system 220 is one component for inserting between the lenses of a VR headset and the display(s) of a VR headset and comprises six shutter cells or segments 220a-220f. This can also be used with a standalone display where the active shutter system 220 is positioned between a user and the display and more preferably immediately adjacent to and fully covering the display. For example, it can be integral with a standalone display or a layer that covers the entire display of a standalone display. As shown in FIGS. 3 and 4, the active shutter system 220 is two components or shutters 27 and 28 for attaching directly to individual lenses such as between the user's eyes and the lenses and wherein each of the shutters comprises several shutter segments 220a-c and 220d-220f as shown in FIG. 3 or single shutter segments 220a and 220b for each eye or lens as shown in FIG. 4. Preferably, the active shutter system 220 comprises shutters 27 and 28 and more preferably shutters 27 and 28 each comprises a single segment 220a and 220b and are positioned between components of a cooperating multipart lens system as shown in FIG. 5.

Shutter segments 220a-220f are multiple cells, pixels or segments that are individually controlled or shuttered. For example, segment 220a is a first segment, segment 220b is a second segment, segment 220c is a third segment, and so on. While FIGS. 2 and 3 illustrate and active shutter system 220 having 2 or more pixels, cells, or segments, the number of segments for the present invention can be one segment or any number of multiple segments. For example, active shutter system 220 may comprises thousands of segments for some applications. Additionally, while FIGS. 2 and 3 illustrate the segments as being a row of adjacent cells from left to right, which matches the refresh pattern of conventional displays, the segments can instead be positioned in a column vertically or in a grid pattern having several rows and columns depending on new refresh patterns for displays or to accommodate other situations or conditions. Preferably, each segment is dark 80%-90% of the time when in use to effectively reduce motion blur. To achieve total darkness 2 or more shutter systems with corresponding segments may have to be fused, bonded, adhered with optical adhesive, or otherwise attached, layered, or stacked on top of each other allied by polarization for complete darkness. In other words, two or more active shutter systems can be stacked with corresponding segments turning on and off simultaneously.

Figure 5:
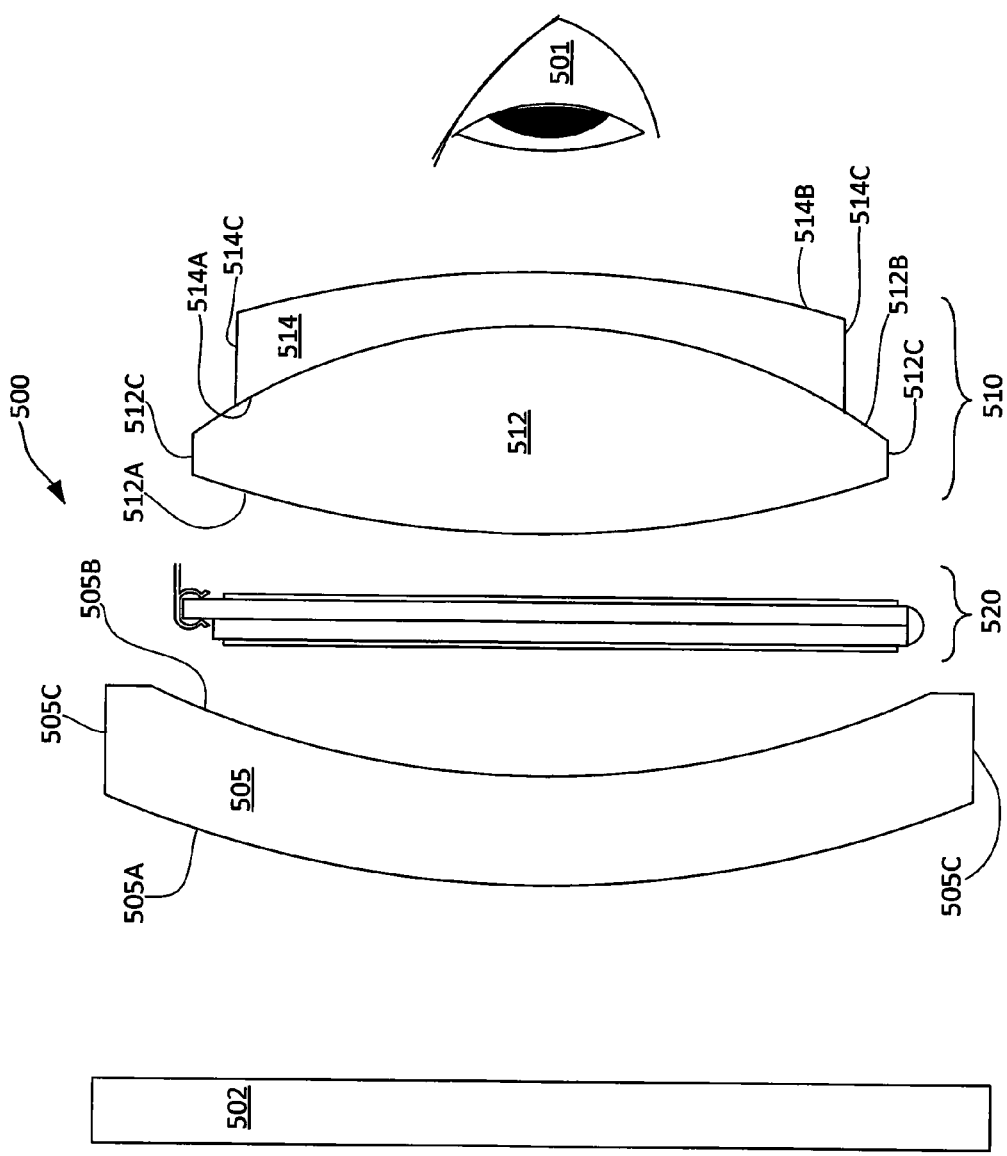
FIG. 5 is a side view of the arrangement of the optical components and shutter system according to the preferred embodiment of the present invention.

In the preferred embodiment, active shutter system 220 comprises two individual shutters 27 and 28 as illustrated in FIG. 16, which are integrated into a lens system 500 shown in FIG. 5. In FIG. 5, each of shutters 27 and 28 are represented by the shutter system 520 within the lens system 500. As FIG. 5 illustrates, lens system 500 comprises a first lens 505, a doublet lens 510, and shutter system 520. Single lens 505 is preferably an annealed optical grade plastic lens which can eliminate distortion. Doublet lens 510 is preferably a glass lens that eliminates chromatic aberration so that there is no color separation. Shutter system 520 is preferably glass and, as discussed throughout the application, is activated as needed and preferably according to a shutter engagement pattern to eliminate or reduce motion blur.

First lens 505 is preferably comprised of plastic or an acrylic polymer per MIL-G-174 such as optical grade polymethyl methacrylate (PMMA) No. 492.574 with an ND of 1.492±0.002 and V of 57.44±2%. Preferably first lens 505 has a first surface 505A and a second surface 505B, both of which are also preferably coated with a high-efficiency anti-reflection coating with a maximum of 0.5% average reflectivity from 450 nm to 650 nm for an angle of incidence of 0 to 10 degrees. Additionally, the RMS surface roughness of first and second surfaces 505A and 505B are about 100 Angstroms. The radius of the second surface 505B is preferably 45.1352 mm and the sagitta (SAG) of the first surface 505A is preferably created by diamond turning and according to the aspheric equation where r is the height from the optical axis of the lens, k is conic constant, and c is the curvature of the base sphere at the optical axis:

$$SAG = \frac{cr^2}{1 + \sqrt{1 - (1-k)c^2r^2}}$$

For example, the following table illustrates the SAG for several heights from the optical axis:

| | |
|---|---|
| R = 1/c | −22.44533 |
| k | −3.01609 |
| Height (mm) | SAG |
| 0.000 | 0.00000 |
| 5.000 | −0.54364 |
| 10.000 | −2.04062 |
| 15.000 | −4.21447 |
| 20.000 | −6.82100 |
| 25.000 | −9.69841 |

Overall, first lens 505 is approximately 50 mm in diameter with a thickness near the optical axis of the lens of 7 mm. To eliminate any rainbow effect, preferably first lens 505 is also annealed.

Doublet lens 510 comprises a second lens 512 and a third lens 514, both of which preferably comprise optical grade glass per MIL-G-174. Second lens 512 preferably comprises SCHOTT® N-LAK10 No. 720.506 with an ND of 1.720±0.002 and V of 50.62±2% from Schott North America, Inc. Second lens 512 also comprises a first surface 512A and second surface 512B that are preferably pitch polished to test plate and have a surface quality of 40-20 scratch/dig. Second lens is preferably manufactured per mil-0-13830, and first surface 512A is preferably coated with a high-efficiency anti-reflection coating with a maximum of 0.5% average reflectivity from 450 nm to 650 nm for an angle of incidence of 0 to 10 degrees. Overall, second lens 512 is approximately 40 mm in diameter and has an overall thickness at the optical axis of about 12 mm. Additionally, first surface 512A preferably has a radius of about 58 mm, second surface 512B preferably has a radius of about 34.238 mm, and preferably finely ground side walls 512C of about 2 mm thickness separate first and second surfaces 512A and 512B.

Third lens 514 preferably comprises SCHOTT® N-SF6 No. 805.254 with an ND of 1.805±0.002 and V of 25.35±2% from Schott North America, Inc. Third lens 514 also comprises a first surface 514A and second surface 514B that are preferably pitch polished to test plate and have a surface quality of 40-20 scratch/dig. Third lens 514 is preferably manufactured per mil-0-13830, and second surface 514B is preferably coated with a high-efficiency anti-reflection coating with a maximum of 0.5% average reflectivity from 450 nm to 650 nm for an angle of incidence of 0 to 10 degrees. Overall, Third lens 514 is approximately 36 mm in diameter and has an overall thickness at the optical axis of about 2.5 mm. Additionally, first surface 514A preferably has a radius of about 34.238 mm (or at least a radius that cooperates with the second surface 512B of the doublet first lens 12), second surface 514B preferably has a radius of about 81.998 mm, and side walls 514C of about 7.61 mm thickness separate first and second surfaces 512A and 512B. Side walls 514C are preferably finely ground.

As shown in FIG. 5, doublet lens 510 individual second lens 512 and third lens 514 are positioned adjacent to each other such that they optically cooperate. Preferably, the second surface 512B of second 512 is bonded to the first surface 514A of third lens 514. More preferably, they are bonded together using Norland® Optical Adhesive 61 from Norland Products Inc. or an equivalent optical adhesive.

Preferably, as shown in FIG. 5, active shutter 520 is positioned between single first lens 505 and doublet lens 510 so that when a viewer's eye 501 is positioned near the second surface 514B of doublet lens 510 the viewer looks at a display 502 through the triplet lens system 500 by looking first through doublet lens 510, then through active shutter 520, and finally through single first lens 505. For purposes of this invention, the terms user, viewer, and participant are used interchangeably. The preferred focal length of the single first lens 505 is 15 mm. The preferred distance between the single first lens 505 and the shutter 520 is 5-8 mm. The preferred distance between the shutter 520 and the doublet lens 510 is 1-2 mm. While preferred distances for the preferred embodiment of the lens as described herein are detailed, it should be understood that shutter 520 should be positioned as close to the doublet lens 510 as possible to match the refractive index and minimize reflection. It should also be understood that combination of lenses and shutters can be assembled for different focal lengths or refractive indexes without changing the scope of the invention.

Figure 6:
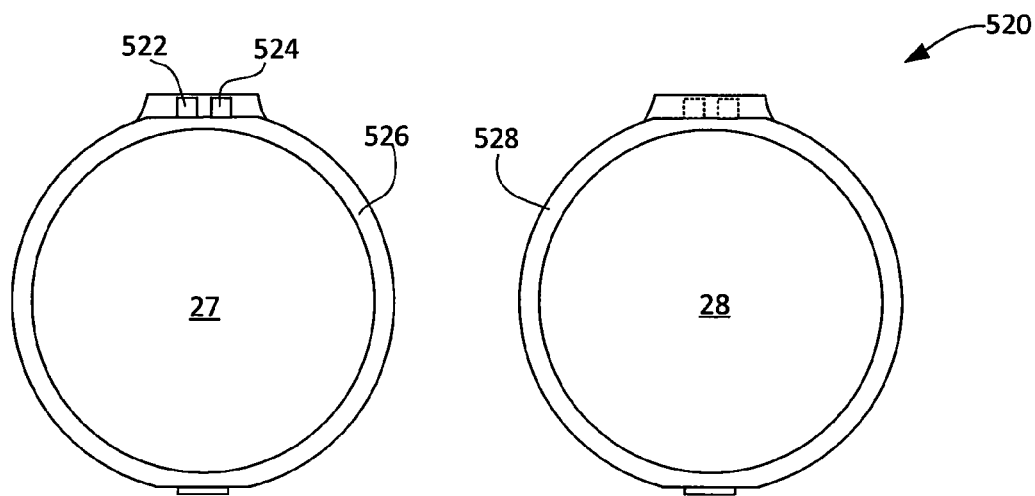
FIG. 6 is a front view of the shutter system according to the preferred embodiment of the present invention.
Figure 7:
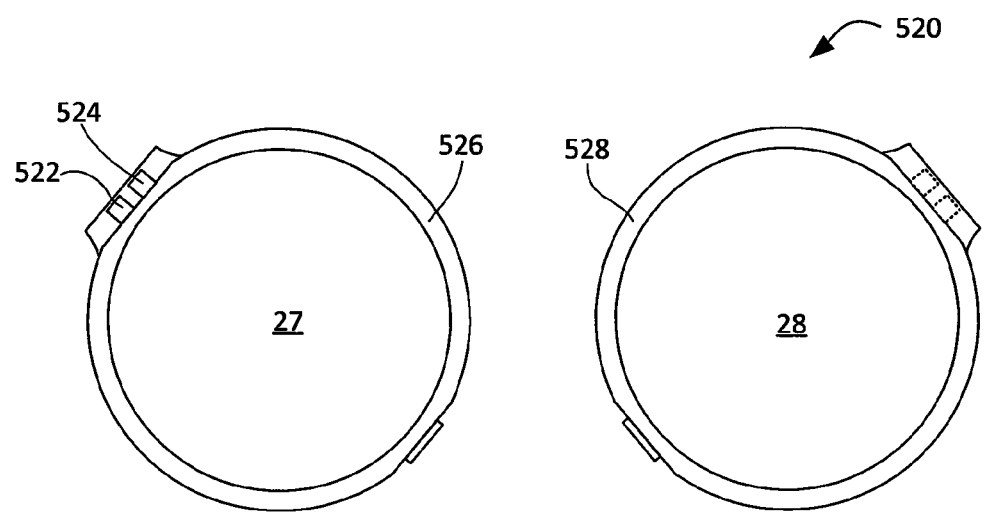
FIG. 7 is a alternative front view of the shutter system according to the preferred embodiment of the present invention.

The preferred embodiment of active shutter 520 comprises any high speed LCD video shutter including twisted nematic liquid crystal displays (LCDs) such as TN cell LCDs or Pi cell LCDs. The shutters generally comprise electroactive material or a liquid crystal layer positioned between polarizing filters, transparent substrates, and optical electrodes, as is known to someone skilled in the art. The polarizing filters preferably have identical orientations that are offset from vertical by about 45 degrees, and the electrodes receive and deliver to the electrostatic material the required voltage necessary to turn the shutter on (activate the shutter so no light passes through) or off (deactivate the shutter so that light passes through). For cooperating with the preferred optical system described herein, active shutter preferably has about a 40 mm overall diameter and is preferably about 2.85 mm thick. Additionally, pins 522 and 524 are oriented along the outer edge of shutter 520 to facilitate electrical contact and communication with the power source. FIGS. 6-7 illustrate an embodiment of shutter 520 for use with the preferred optical system described herein.

It is important that the shutters be aligned properly with the polarization layer of the cooperating display or mobile device display. The alignment will vary based on the polarization of the display and depending on whether the shutters both have pins 522 and 524 facing in the same direction. For example, a first face 526 of shutter 520 includes pins 522 and 524, and a second face 528 does not, as shown in FIGS. 6 and 7. One or more shutters 520 face the same direction when they each have their pins 522 and 524 facing the same direction or, in other words, their first faces 526 oriented similarly. When the first face 526 of a first lens 27 points toward the display and the second face 528 of a second lens 28 points toward the display, then the shutters are oriented oppositely, which is what is shown in FIGS. 6-7. When oriented oppositely, then one shutter 27 should be aligned with its pins between 9 o'clock and 12 o'clock while the other shutter 28 should be aligned with its pins between 12 o'clock and 3 o'clock. FIG. 6 illustrates pins oriented at 12 o'clock, which may be appropriate for an in-plane switching (IPS) display. FIG. 7 illustrates pins oriented at 10 o'clock and 2 o'clock, which may be appropriate for an active-matrix organic light-emitting diode (AMOLED) display.

Using the shutter control and processing components 230, the active shutter system can be pulsed between on and off at a static speed or at a variable speed according to predetermined parameters or in response to information sensed and recorded while the headset and active shutter system is in use. The active shutter system also may be configured so that each eye experiences the shutter as on or off at the same time or such that each eye experiences something different while the shutters alternate when they are on or off. Additionally, where multiple shutter segments are present, each segment can be pulsed between on and off according to a static, variable, or dynamic pattern. Moreover, the shutters can be pulsed in a cascading pattern to match the refresh rate of the cooperating display such as when mobile devices are oriented in landscape mode and refresh from left to right. Finally, the pulse rate optionally can be dynamically synchronized with the output of an optical sensor, accelerometer, or magnetometer that is part of the shutter system or part of the headset system and the display refresh rate to compensate for display refresh rates and for faster or slower head motion of the user.

The shutter control and processing components optionally may further comprise communication components for establishing a data link between the headset and the apparatus for controlling motion blur 200. For example, the data link may be established with communication links and protocols including but not limited to short range wireless communications such as Bluetooth, local area wireless technology, infrared data transmission methods, radio frequency communication, ANT+data transmission, ZigBee communication protocols, universal serial bus (USB) communication links, or I13 1394 high speed serial bus communication links such as Firewire. With the data links, information obtained, collected, and/or stored such as information collected from sensors on the headset system can be shared with the apparatus 200 so that the shutter system 220 can be controlled according to or to coordinate with the data.

Figure 8:
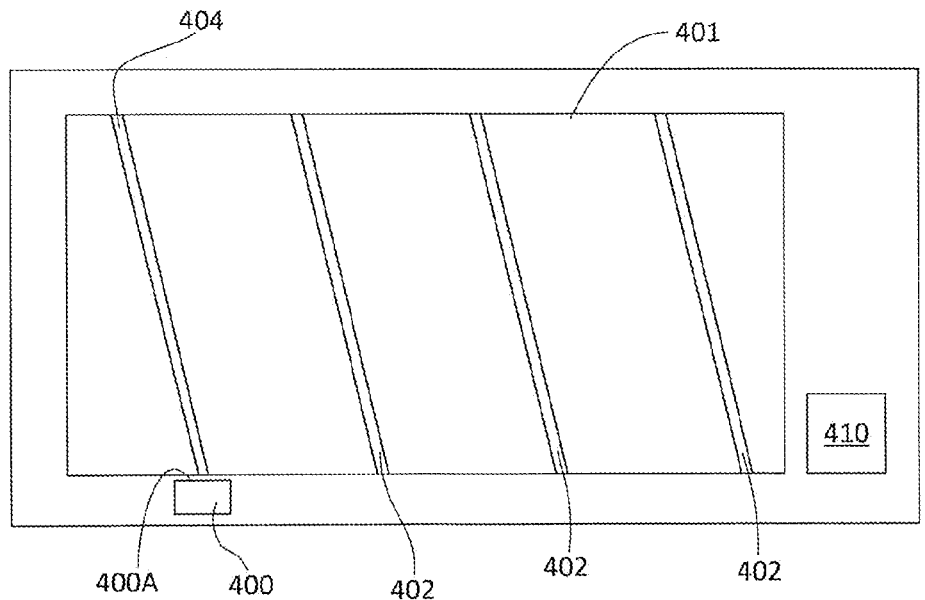
FIG. 8 is an illustration of a display cooperating with an optical sensor according to the preferred embodiment of the present invention.

FIG. 8 illustrates the optical sensor placement in one embodiment of the invention. Optical sensor 400 is preferably placed and oriented with its sensor face 400A directed at the display so that it can sense color changes, heat changes, or light intensity variations of one section of a display 401 and takes multiple snapshots of data every second. Preferably, optical sensor 400 is positioned on a surface facing directly at the display without being in field of view of the user. For example, it can be positioned on a lens plate or a housing for a lens and oriented facing the display. To get the best data, for some displays, optical sensor 400 is positioned also preferably near the center of a first display area. The first display area can be the first area of a display to refresh where a single display is divided into multiple display areas or it can be the first display to refresh where multiple displays are present. Optionally, however, multiple optical sensors can be used so that multiple or all display areas cooperate with an optical sensor. Additionally, for some embodiments, multiple optical sensors place at multiple locations are preferred to enhance the reliability of the collected data. For example, where shifts in color intensity are important, multiple sensors will be more likely to detect the shift.

Optical sensor 400, or optionally multiple optical sensors, takes measurements or pictures of photon data multiple times per second. Optical sensor 400 preferably senses or collects data about the displays brightness, color intensity, and heat. By sensing the display characteristics and comparing them to each other, the moment of refresh, the refresh frequency, and where appropriate, the phase shift, of the display can be determined and the activation of the shutters can be controlled accordingly. Optical sensor 400 can be used both with popular active-matrix organic light-emitting diode (AMOLED) displays, with in-plane switching (IPS) displays, and with other types of displays. Optical sensor preferably communicates data directly to the shutter control and processing components 230 either with a direct wired connection or wirelessly. One type of optical sensor useful for this invention is a LED 3 mm phototransistor such as Part No. XRNI30W-1 from SunLED Company, LLC of Walnut, Calif. The optical sensor should sense the desired wavelengths (such as visible light), have a fast response time and not have a lot of dark light current or noise. The optical sensor preferably detects and collects characteristics of the photons emitted from the display and the gathered data can be evaluated to find peaks of brightness, lulls of darkness, color shifts, color intensity variations, and heat changes, for example.

Figure 9:
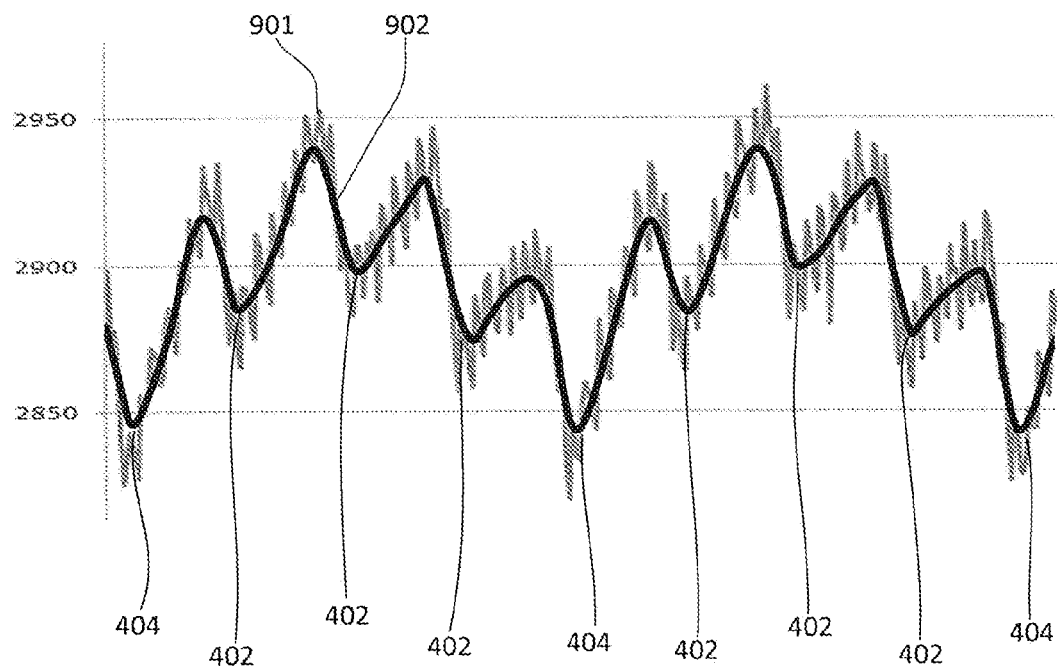
FIG. 9 is a graph illustrating how the moment of refresh is identified from data recorded with the optical sensor of the preferred embodiment of the present invention.

FIG. 8 also illustrates a screen shot of an AMOLED display as the refresh line 402 of the display passes in front of the sensor. Refresh line 402 looks similar to LCD pulses 404, but differs as the photonic data changes more significantly for refresh line 402 but not for pulses 404. FIG. 9 illustrates the brightness changes detected by the optical sensor 400 over time as it senses refresh line 402 and pulse lines 404. In order to optimally reduce motion blur, it is preferred to activate shutters when the refresh line 402 passes the viewer's field of view but not when the pulses 404 pass the viewer's field of view. Looking at FIG. 9, the moment of refresh occurs when the refresh line begins at one edge of the display, and the refresh frequency is the time between a first moment of refresh and a second moment of refresh. Actively detecting the screen refresh is especially important for AMOLED displays, which are popular in many mobile devices, as the displays are constantly refreshing.

For in-plane switching (IPS) displays where a refresh line is not as readily apparent, the optical sensor 400 monitors specifically for light intensity shifts and changes. When optical sensor 400 detects the switch, the moment of refresh and the rate or frequency of refresh can be detected to set a refresh phase lock according to which the shutters can be activated and deactivated.

With any type of display and with IPS displays especially, additional data indicating the moment of refresh can be gathered or recorded with motion sensors 410 that measures slight movements of a viewer's head. Motion sensors 410 include, for example, accelerometers, magnetometers, and gyroscopes. Typically, a viewer will adjust his position when the refresh occurs. Motion sensor 410 is also useful to measure head movements with any type of screen to adjust for sudden movements. In order to reduce motion blur, the shutters are preferably activated when sudden head movement occurs regardless of the screen or display refresh. Additionally, motion sensor 410 can be used to trigger components to go into a sleep mode if desired when there is a lack of head motion. As with optical sensor 400, motion sensor 410 preferably communicates data directly to the shutter control and processing components 230 either with a direct wired connection or wirelessly. Motion sensor 410 can be positioned on or near the display, on or near the lenses or shutters, on the headset, or on the viewer's head either directly or on a cooperating device as long as it is capable of detecting a viewer's head movements. One type of motion sensor useful for this invention is a micro-electro-mechanical 3 axis, 16-LGA accelerometer such as Part No. LIS331 DLHTR from STMicroelectronics of Geneva, Switzerland.

The method of viewing video content with reduced motion blur comprises displaying content that can be viewed as three dimensional content on the stereoscopic displays. For example, a user can activate three dimensional (3D) video mode to display 3D content with a physical switch or button, by selecting the option on a graphical user interface (GUI), or by simply inserting his mobile device into the HMD frame 140 if a VR headset system for mobile devices is being used. Where the user activates 3D video mode by placing his mobile device in HMD frame 140, sensors or switches recognize proper placement of mobile device 5 or mobile device case 12 in HMD frame 140 as is known to those skilled in the art and activate 3D video playback accordingly. Software for executing 3D video mode can be optionally stored in the memory and executed by the processor of the shutter control and processing components or the control and processing components of the cooperating VR system or stored remotely and/or executed remotely and accessed using communication components of the shutter control and processing components or control and processing components of the cooperating VR system.

Preferably, before initiating the method of viewing content with reduced motion blur, the viewer has properly oriented shutters 27 and 28 so that the polarity of the shutters is aligned with the polarity of the display. For the preferred shutter and optical arrangement discussed herein, shutters 27 or 28 should be individually aligned to match the polarity of the cooperating display keeping in mind that shutters 27 and 28 have opposite faces oriented toward the display as discussed above. Preferably, shutters 27 and 28 are manually adjusted by the user by simply twisting the shutters among several positions. Optionally, electromechanical components can be incorporated to automatically adjust shutters 27 and 28.

Figure 10:
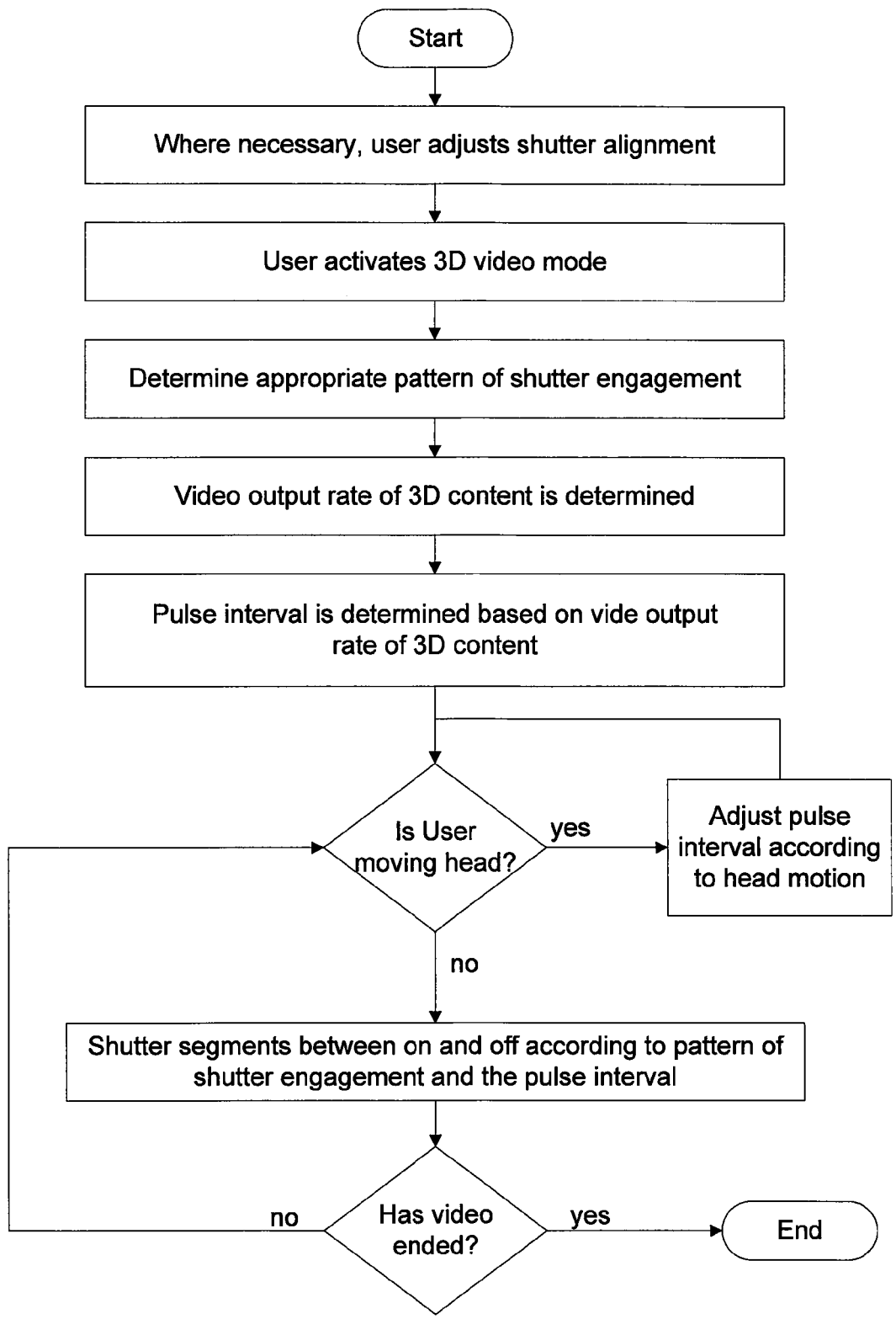
FIG. 10 is a flow chart of a method of controlling the active shutter system during video playback.

Once 3D video mode has been activated, the shutters are pulsed on and off according to a shutter engagement pattern that can take into account many factors. FIG. 10 illustrates a first example of a method for controlling the shutter engagement. As shown in FIG. 10, after a user activates 3D video mode, the appropriate pattern of shutter engagement is determined. The shutter engagement pattern can be any pattern of turning on an off shutter segments including, for example, first turning a first shutter segment 220a off while the rest remains on, second turning second shutter segment 220b off while the rest remain on, third turning third shutter segment 220c off while the rest remains on, fourth turning fourth shutter segment 220d off while the rest remains on, fifth turning fifth shutter segment 220e off while the rest remains on, and sixth turning sixth shutter segment 220f off while the rest remains on. After cycling through the six segments, the pattern repeats until the user stops the video or another action prompts a change in pattern. After the shutter engagement pattern is determined, the video output rate can be determined and a pulse interval can be determined that corresponds to the video output rate. Optionally, additional conditions can be assessed such as head movement, and the pulse interval can be altered based on the assessed conditions using software optionally stored in the memory of the shutter control and processing components and executed by the processor of the shutter control and processing components or stored remotely and/or executed remotely and accessed using communication components of the shutter control and processing components. Finally, the shutter segments are engaged according to the shutter engagement pattern and the pulse interval until the video is concluded or until the user affirmatively stops the video playback.

While FIG. 10 illustrates one method for controlling the shutter segment engagement, other methods of controlling the shutter segment engagement can be used without altering the scope of the invention. For example, many different patterns of shutter engagement can be selected and additional or different conditions can be sensed and assessed to alter pulse rates. The preferred shutter engagement pattern for the embodiment of the shutters where two shutters are used and each shutter has one segment as illustrated in FIG.

Figure 11A:
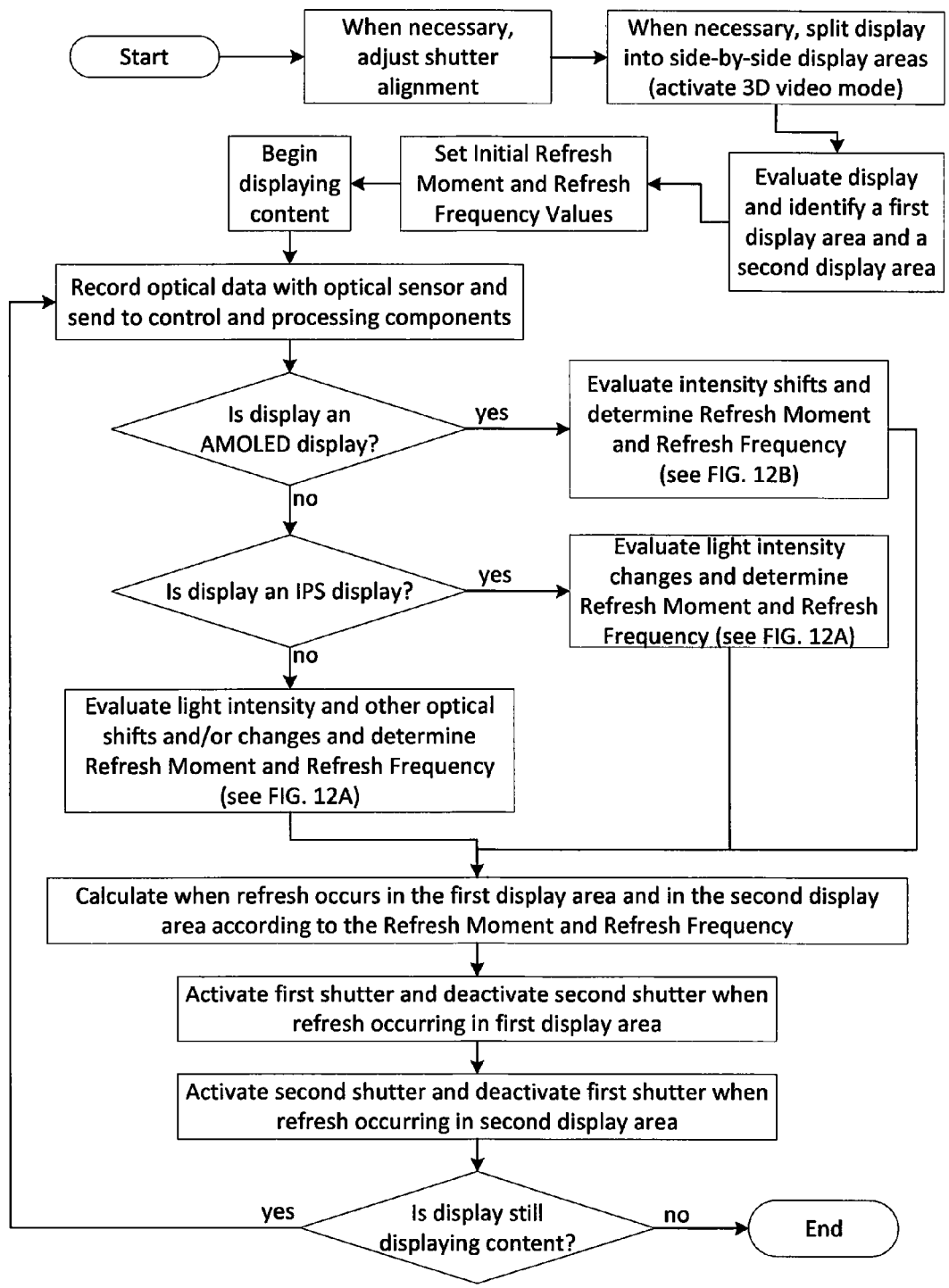
FIG. 11A is a flow chart of a preferred method of controlling the shutters of the active shutter system during video playback.
Figure 11B:
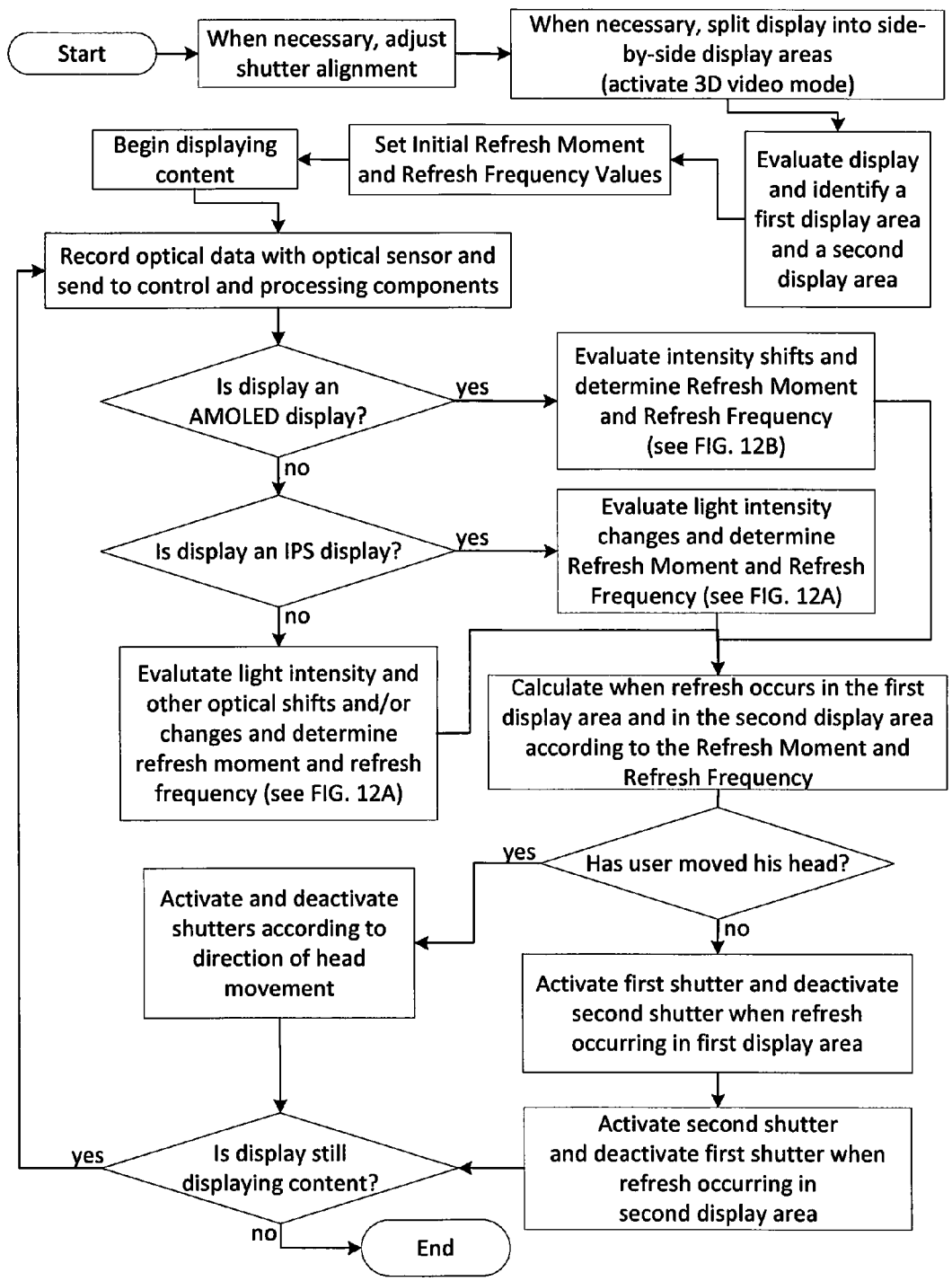
FIG. 11B is a flow chart of an alternative method of controlling the shutters of the active shutter system during video playback.

4 is to have the first shutter activated when the first display area is experiencing refresh and to have the second shutter activated when the second display area is experiencing refresh. FIG. 11A illustrates the method of activating first and second shutters 220a and 220b according to a preferred embodiment of the present invention. FIG. 11B illustrates an alternative method of activating first and second shutters 220a and 220b where the user's motion is also considered. FIG. 12 illustrates a method for determining the moment of refresh and the refresh frequency according to the present invention. For each of the methods, software is stored in the memory and executed by the processor of the shutter control and processing components or alternatively stored remotely and/or executed remotely and accessed using communication components of the shutter control and processing components.

Figure 12A:
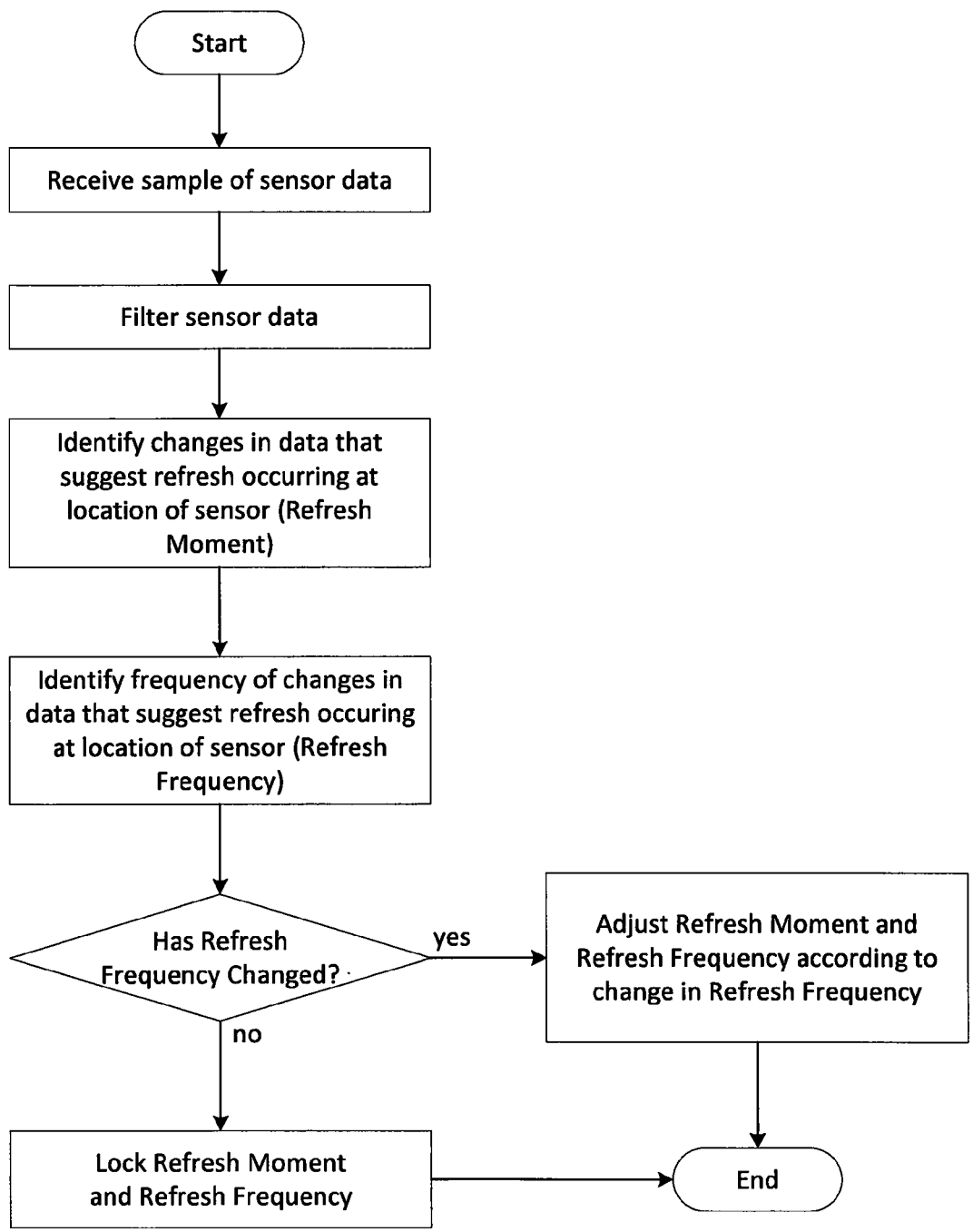
FIG. 12A is a flow chart of a method of evaluating optical data to determine a refresh moment and refresh frequency according to the present invention.
Figure 12B:
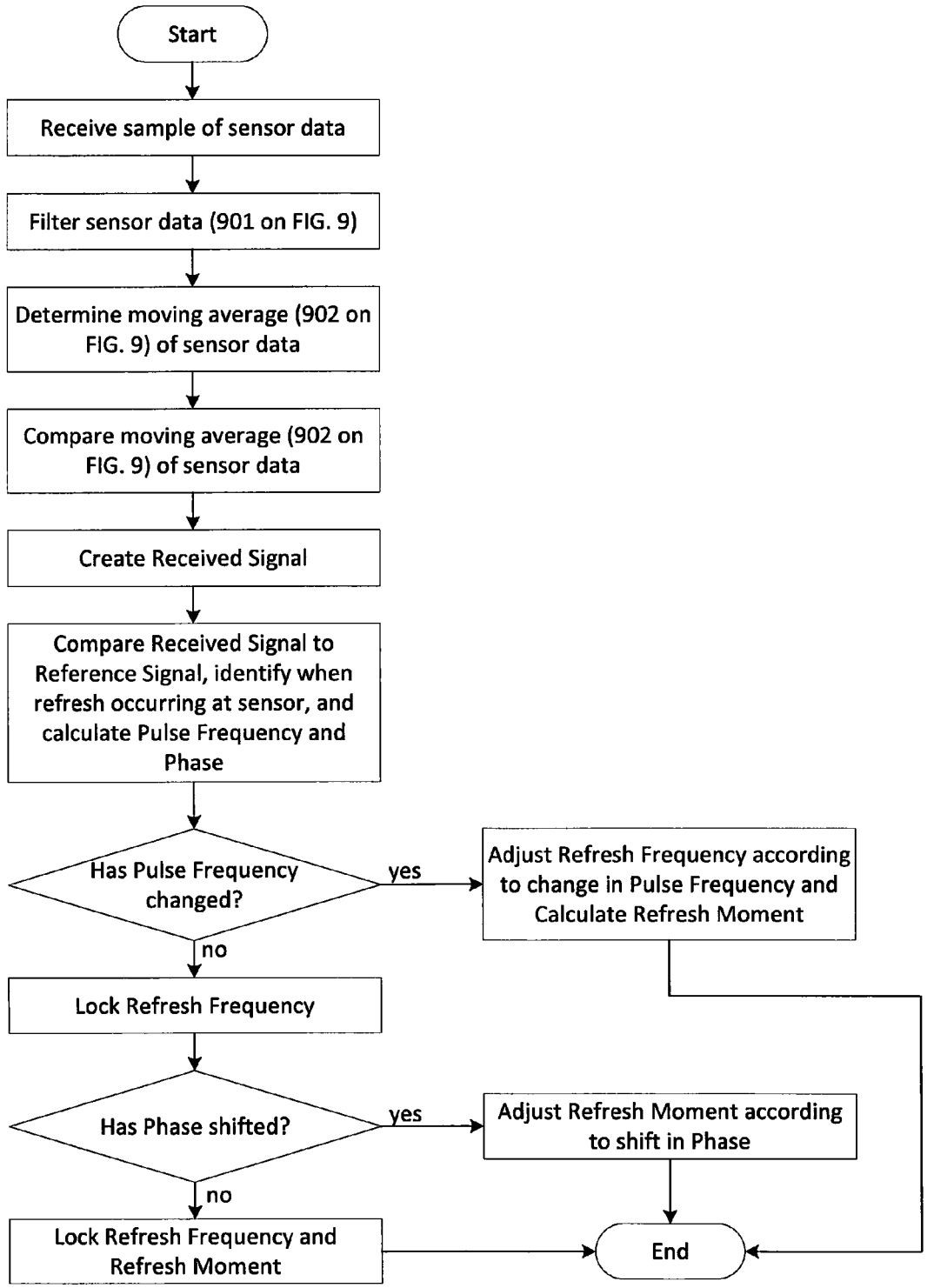
FIG. 12B is a flow chart of an alternative method of evaluation optical data to determine refresh moment and refresh frequency according to the present invention.

As shown in FIGS. 11A, 12A, and 12B, a user aligns the shutters for his selected display where necessary and further enables the 3D video mode or otherwise causes a single display to split into two identical adjacent first and second display areas where necessary. Once two display areas are present either by splitting a single display or by using two independent displays, the first display area and second display area are identified and the content is delivered to both displays. Initially, a first Refresh Moment value and a first Refresh Frequency value are set. The Refresh Moment and Refresh Frequency values can be set simply at zero or they can be set at an average value for the type of display being used. The optical sensor then obtains a sample of data about the display characteristics while the content is delivered. The sample of data can be any size, but preferably is about 4 frames of data, which for a refresh rate of 60 frames per second is about 0.07 second. The sample of optical sensor data, which is also known as optical data, is delivered to the shutter activation software stored on and executed by the shutter control and processing components where it is evaluated to determine the Refresh Moment. The Refresh Moment is the moment when the screen is refreshing in the area cooperating with the optical sensor and will be further discussed below. The optical data is also evaluated to determine the Refresh Frequency, which is the time between successive refresh moments. For some types of displays, a shift in Phase also should be identified and accounted for when determining the Refresh Moment as described further below and illustrated in FIG. 12B. After the Refresh Moment and Refresh Frequency are determined, then the time when the first display area is refreshing can be calculated and the time when the second display area is refreshing can be calculated. According to the calculations, the first shutter is then activated to block the user's view of the first display area when the first display area is refreshing, and the second shutter is deactivated to allow the user to view the second display are when the first display area is refreshing. Additionally, the second shutter is activated to block the user's view of the second display area when the second display area is refreshing, and the first shutter is deactivated to allow the user to view the first display are when the second display area is refreshing. The method of collecting optical data, evaluating the optical data, and activating or deactivating the first and second shutters according to the optical data preferably continuously repeats as the content is delivered to the display. Alternatively, the method can repeat at given intervals such as repeat once every second or it can repeat after a triggering event such as when a motion sensor senses a threshold amount of movement. Additionally, the method can occur as optical data is being sampled or it can occur after the optical data is sampled depending on the speed and efficiency of the processor used.

Because various display types have different indicators of refresh moments, the data from the optical sensor will be evaluated according to the type of display. For example, with AMOLED displays a refresh line travels across the display areas as the display refreshes as illustrated in FIGS. 8 and 9. FIG. 12B illustrates a method for evaluating the optical data from an AMOLED display. As shown, a received sample of the optical data is first filtered, the result of which can be seen by the line 901 on FIG. 9. Then, a moving average of the filtered data is calculated, which is seen as line 902 on FIG. 9. The moving average is compared to the filtered data to create a received signal. For example, where the filtered data is less than the moving average, an output signal of 1 is set and where it is not, an output signal of 0 is set. The Received signal is then compared with a reference signal to identify when refresh 404 is occurring at the sensor location and to calculate the frequency of pulses 402 identified at the sensor location and any shift in phase, which is further illustrated in FIG. 9. If the pulse frequency has changed, then the Refresh Frequency is adjusted and the Refresh Moment is calculated. If the pulse frequency has not changed, then the Refresh Frequency is locked and whether a shift in phase has occurred is evaluated. Where a shift is phase has occurred, the Refresh Moment is adjusted the amount of the phase shift. Where no shift in phase has occurred, the Refresh Moment is also locked. Once the Refresh Moment and Refresh Frequency have been identified, then when the Refresh Moment is at the first edge of the display where refresh begins can be calculated. The first shutter 27 is then activated while the refresh line passes a first display area and the second shutter 28 is activated while the refresh line passes the second display area. Alternatively, with IPS displays, light intensity shifts when refresh is occurring and shifts in phase are not a concern. FIG. 12A illustrates how the optical data is evaluated for IPS and other types of display. As shown, a sample of optical data is filtered and then the changes are evaluated to identify the Refresh Moment and the Refresh Frequency. The Refresh Frequency is compared to the previous Refresh Frequency and where a change has occurred, the Refresh Moment and Refresh Frequency are updated accordingly. Where no change has occurred, the Refresh Moment and Refresh Frequency remain the same. Accordingly, the optical sensor data indicating the Refresh Moment will be when a shift of intensity is detected, and the first shutter 27 is then activated while the intensity shifts in the first display area and the second shutter 28 is activated while the color shifts in the second display area. Finally, other display types can be accommodated as well as using the same method where changes in the display characteristics are recorded and evaluated, and the shutters are activated according to when their cooperating area of the display is experiencing such changes.

FIG. 11B illustrates a variation of the method described with respect to FIG. 11 where motion of the user further alters when the shutters are activated. Motion sensors 410 preferably record head motion of the user and deliver the motion data to the shutter activation software stored on and executed by the shutter control and processing components for further evaluation. The motion data is useful both for determining when the refresh moment occurs and for compensating for motion blur caused by excessive or sudden head movement. Often when a display refreshes, the viewer unknowingly moves his head. By detecting that movement, the motion data can be evaluated to help identify the moment of refresh. Additionally, when a user suddenly moves his head, motion blur can occur and the shutters may need to be temporarily activated to prevent motion blur. Accordingly, when sudden movement is sensed, one or both of the first and second shutters are activated while the head is moving. After the user's head stops moving, then the shutters will continue to operate according to the original shutter engagement schedule. Motion sensor 410 and the gathered motion data can also be used to trigger a sleep mode of the optical sensor and corresponding software when there is a lack of motion. In such case, then the viewer can manually reactivate the optical sensor and related software by, for example, pressing a button, or the optical sensor and processing can automatically restart when motion is sensed again.

Additional embodiments of a modular and convertible VR headset 10 that can cooperate with the apparatus for reducing motion blur of the present invention are shown in FIGS. 13-29. As shown in FIGS. 16-19 and 22-24 the modular segments of a VR headset system 10 preferably include a headset 11 with a frame assembly comprising a device module 4 and a support module 6, a lens module 8, a comfort module 15, and a strap 19. Additionally, as shown in FIGS. 16-17, the modular segments may also include a dedicated mobile device case 12. Device module 4 comprises a base 14, an optional seal 13, and a receptacle or dock 14a defined by or attached to base 14 with optional locks 9 for accommodating the mobile device case 12 or a mobile device 5 directly. Additionally it optionally defines a slot 14d to accommodate active shutters 400. Lens module 8 comprises a lens plate 20, a first lens 22, a second lens 24, a first lens cup 23, a second lens cup 25, a first shutter 27, a second shutter 28, and a lens adjuster 26. Support module 6 comprises one or more of a first side wall 16, second side wall 18, upper wall 32, lower wall 34, corners 36, edges 38, and covers 32a and 34a. Alternatively, support module 6 comprises an outer wall or shell 61 and an inner wall or shell 64 that attach together and cooperate with each other to form a substantially continuous walled structure. In order to facilitate customization, specific uses, and upgrades, the modular segments cooperate and are secured together with the use of screws, snaps, latches, tension devices, clasps, quarter turns, twist locks, push screws, hook & loop connectors, tongue and groove connectors, and other methods of removably securing components together as is well known to those skilled in the art. Preferably, the components are removably secured such that they do not easily detach when in use. More preferably, the components are removably secured together with simple locking mechanisms or in such a manner that a tool must be used to facilitate detachment. For example, as shown in FIGS. 19-27, several modules attach with nesting extensions 29, 45, 62, 65, and 90 and a plug, key, or insert 72 that extends through holes defined by the extensions.

Figure 28:
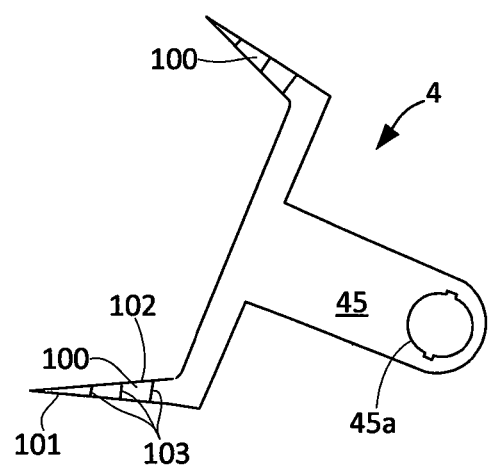
FIG. 28 is a side view of an open position of an embodiment of an alternative lock of the fifth embodiment of the virtual reality headset of present invention.
Figure 29:
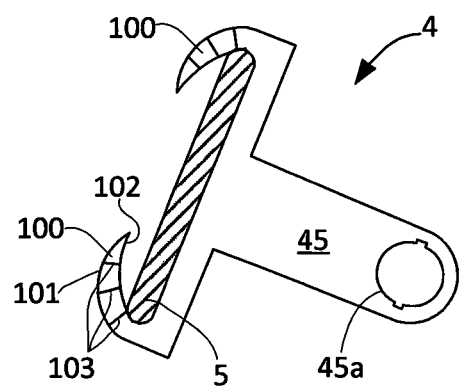
FIG. 29 is a side view of the lock shown in FIG. 28 cooperating with a mobile device.

Base 14 of device module 4 is an assembly, frame, or rack with an integral or attached receptacle or dock 14a for preferably cooperating with or holding the mobile device 5 directly or alternatively for cooperating with or holding the dedicated mobile device case 12. Dock 14a can be a receptacle, an opening, a surface, one or more fasteners, or any other type of structure capable of temporarily holding two components together or positioning two components side-by-side. If using dedicated mobile device case 12, preferably the mobile device is securely positioned within case 12 such that the VR headset system cooperates with the mobile device 5 and such that the mobile device's display is viewable to the user when wearing and using the VR headset and system. The mobile device 5 or case 12 can slide into the dock 14a formed by base 14 through an opening on one edge or side of base 14. Alternatively, the mobile device 5 or case 12 can be snapped into, pressed into, set into, or dropped into the dock 14a at an opening on one of the large sides of base 14. Also alternatively, the mobile device 5 or case 12 can be placed, set, or positioned against dock 14a. The mobile device 5 or case 12 preferably is secured in place with a lock 9. Lock 9 can be, for example, a door, slide, clamps, clasps, magnets, cooperating hook and loop fasteners, cooperating tongue and groove fasteners, a pull tension-type latch, opposing or surrounding fin ray extensions, or other physical locking mechanism as is known in the art. FIG. 17 illustrates examples of locking mechanisms suitable for securing a mobile device 5 or case 12 to base 14. FIGS. 19-26 illustrate a preferred lock 9 comprising a pull tension-type latch having a first latch arm 41 pivotally attached with a connector 48 to base 14 near its perimeter and a second latch arm 42 pivotally attached with a connector 48 to base 14 near its perimeter and on an opposite edge from where second latch arm 42 attaches to base 14. Second latch arm 42 further includes a spacer 49 pivotally attached with a connector 48 to latch arm 42 near its longitudinal center. Spacer 49 is preferably comprises resilient material so that it can deform and apply gentle pressure against a mobile device 5 docked in the dock 14a of base 14, as shown in FIG. 26. First arm 41 further pivotally attaches with a hinge mechanism 43 to second arm 42, as shown in FIGS. 25-26. The pull-tension type latch is released by pulling first arm 41 up and away from second arm 42. The pull-tension type latch is engaged by pushing first arm 42 down toward and adjacent to second arm 42. An alternatively lock 9 is illustrated in FIGS. 28 and 29 and comprises two or more fin ray extensions 100 that open and close when pressure from the mobile device 5 is applied to the inner flank 101. Each fin ray extension 100 comprises pliable inner and outer flanks 101 and 102 that are joined at their tips and form an acute angle. The two flanks are connected by a plurality of ribs 103 which hold the struts 101 and 102 apart and allow elastic movement. When one flank 101 is subjected to pressure, the geometrical structure automatically bends in the direction opposed to the force applied.

Mobile devices include any personal electronic device or any mobile or handheld device that has a screen or display including but not limited to mobile phones, cellular phones, smartphones, tablets, computers, dedicated displays, navigation devices, cameras, e-readers, and personal digital assistants. Mobile devices displays including mobile dedicated displays can be any type of display including but not limited to light-emitting diode displays, electroluminescent displays, electronic paper or E ink displays, plasma displays, liquid crystal displays, high performance addressing displays, thin-film transistor displays, transparent displays, organic light-emitting diode displays, surface-conduction electron-emitter displays, interferometric modulator displays, carbon nanotube displays, quantum dot displays, metamaterial displays, swept-volume displays, varifocal mirror displays, emissive volume displays, laser displays, holographic displays, light filed displays, or any other type of output device that is capable of providing information in a visual form. Preferably, in addition to having a screen or display, the mobile device comprises an operating system, can run various types of application software, and is equipped with communication components. Optionally and preferably, especially for a mobile device that is a dedicated display, the mobile device further comprises a high-definition multimedia interface (HDMI) port, a universal serial device (USB) port, or other port or connection means to facilitate direct or wireless connection with a computing device or larger display device such as a television.

Figure 14:
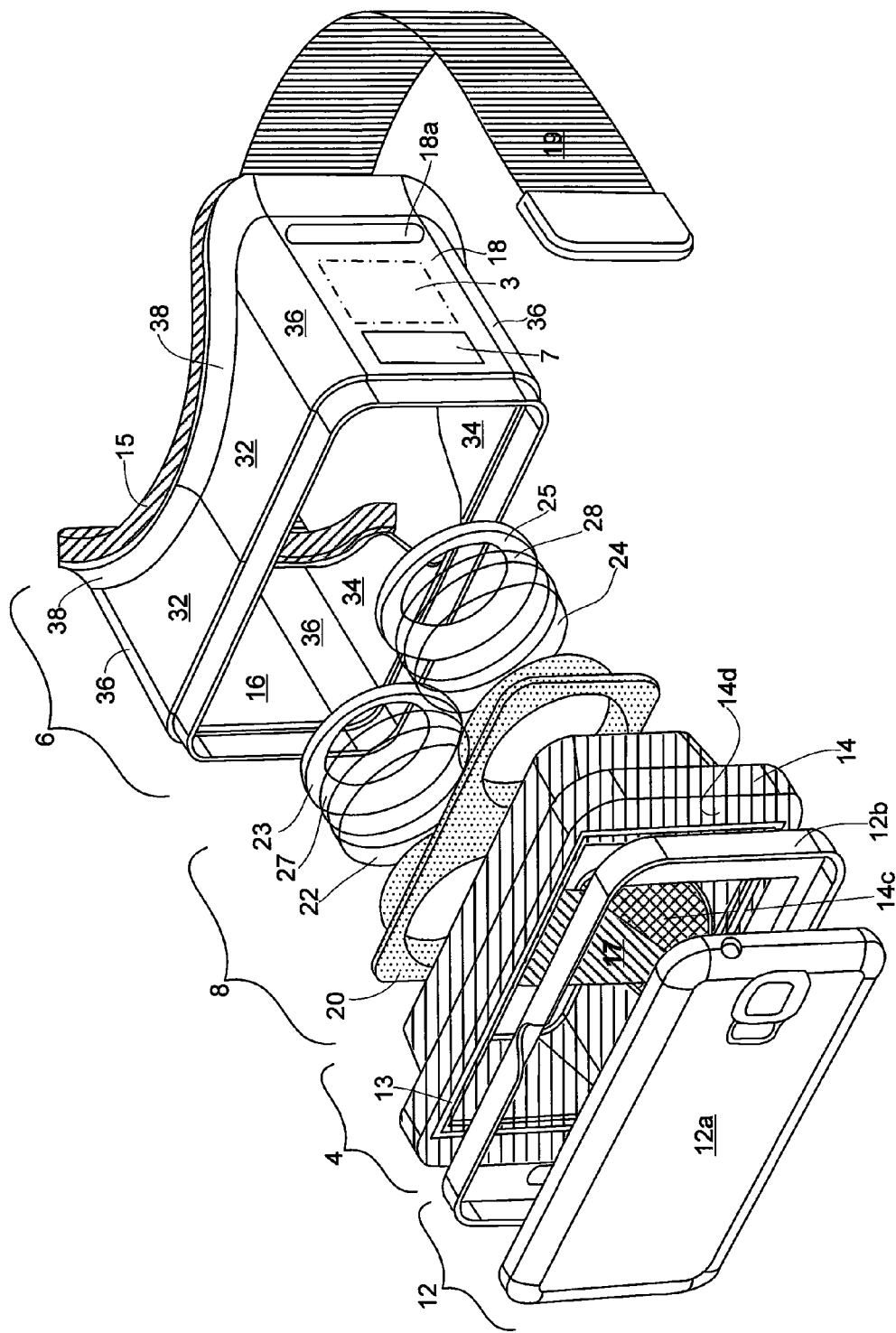
FIG. 14 is a perspective exploded view of a third embodiment of the virtual reality headset of the present invention.

Optional seal 13 of device module 4 is positioned to provide a tight and secure fit between the display side of the mobile device 5 and base 14 or between the display side of case 12 and base 14. Seal 13 can be removable and customizable or it can be permanently affixed to base 14. Additionally, seal 13 can be narrow as shown in FIG. 14 or it can cover a larger or all of the front surface 14d of base 14. Base 14 and seal 13 can each or both optionally and preferably comprises a divider 17 located at its approximate midpoint such that it equally divides the display space on the mobile display with which it cooperates as shown in FIGS. 14-16 and 19-21. Divider 17 is located between the user's eyes when the user wears the VR headset 10 so that each eye sees a different image. Divider 17 can be removable or customizable or it can be affixed to base 14. Base 14 also preferably covers, on the screen or display side of the mobile device, all of the side except for the mobile device display.

Base 14 optionally can include mirrors (not shown) for further enhancing the user's view of the display on the mobile device with which it cooperates. Base 14 also optionally includes a nose piece 14c for providing a comfortable fit for the user. Nose piece 14c can be integrally formed with base 14 or a separate component attached to base 14. Preferably, nose piece 14c is integral with base 14, formed of a substantially solid surface, and contoured to accommodate a user's nose. Optionally, nose piece 14c is easily removable and replaceable and is available in a variety of sizes and colors to accommodate a user's features and preferences.

Figure 21:
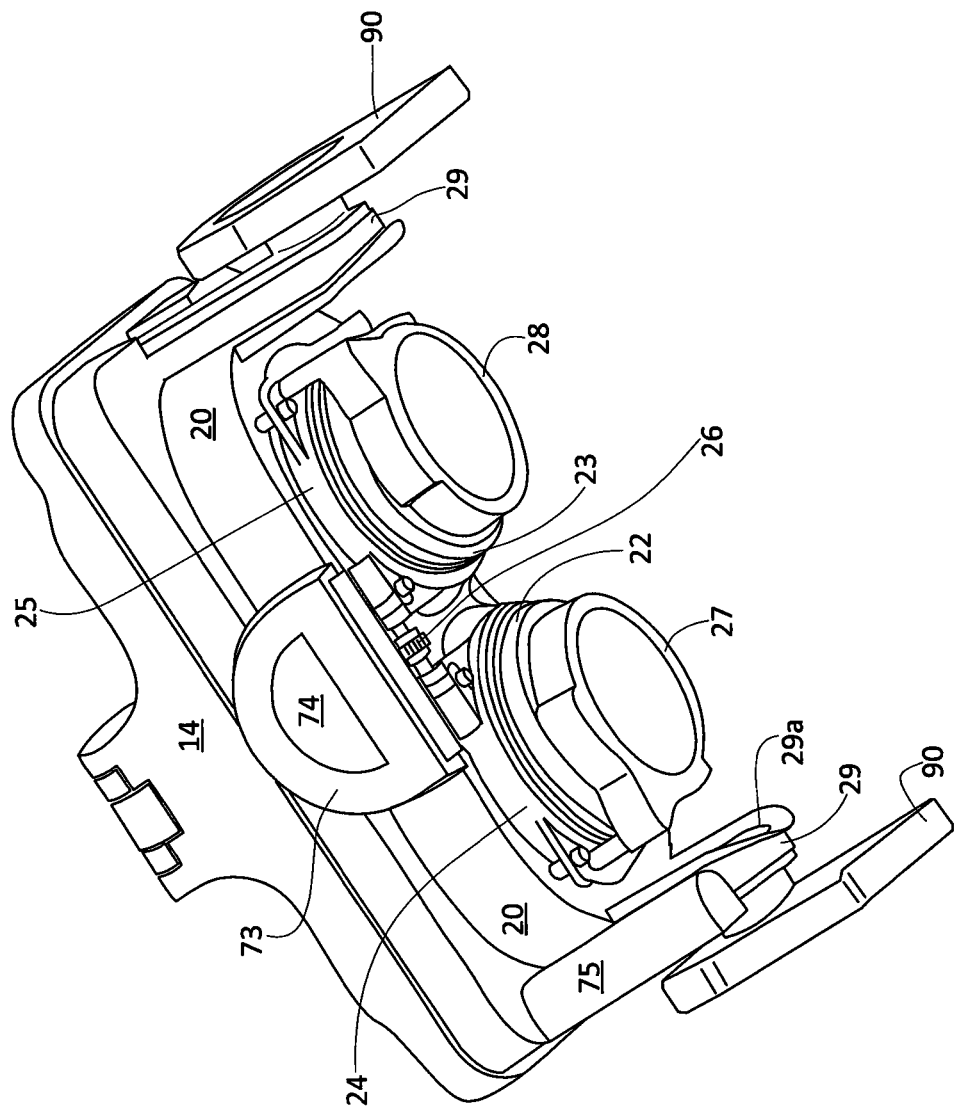
FIG. 21 is a perspective view of the device module and lens module of the fifth embodiment of the virtual reality headset of the present invention.
Figure 22:
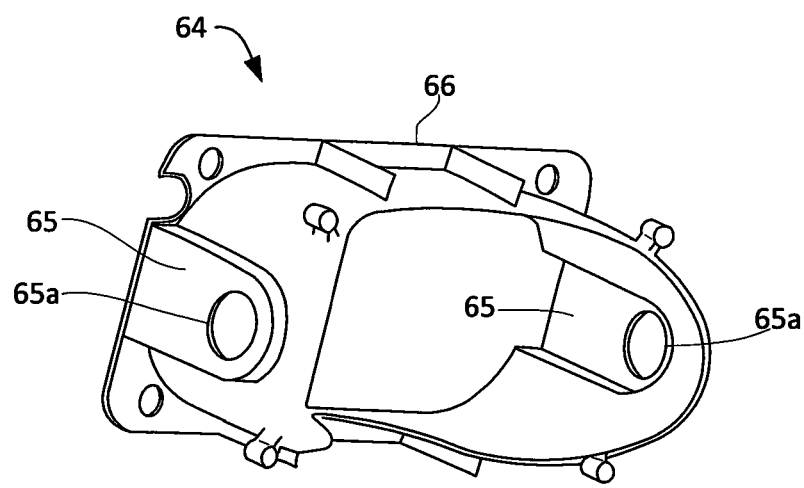
FIG. 22 is a perspective view of the inner shell of the support module of the fifth embodiment of the virtual reality headset of the present invention.

Additional features can be incorporated into base 14 to accommodate accessories. For example, base 14 can also define a slot 14b for inserting additional filters or screens or mirrors to alter the user's viewing experience or such options can be permanently secured in base 14. Slot 14b can accommodate shutter system 400 as well. Openings, access ports, and buttons can be located at various locations around base 14 to accommodate physical buttons, microphones, headphones, USB ports, communication components, computer and computing components, and other components that are either present on the mobile device or are part of additional headset components such as additional displays, cameras, and audio devices. Base 14 also optionally includes an easily accessible housing location for optional communication components such as near field communication (NFC) components or other control and processing components 3. FIG. 21 illustrates a housing 75 that can be attached to base 14 to house such components.

Base 14 preferably comprises a substantially rigid or semi-rigid material capable of securing the weight of the mobile device and/or case 12 with which it cooperates. Base 14 can be a solid color or can incorporate designs or patterns, and preferably base 14 is available in a variety of colors, designs, and patterns to accommodate the specific tastes of the user. For example, if the user prefers the color pink, the user can select a pink base 14. Alternatively, if the user prefers green camouflage, the user can select a green camouflage base 14.

Figure 13:
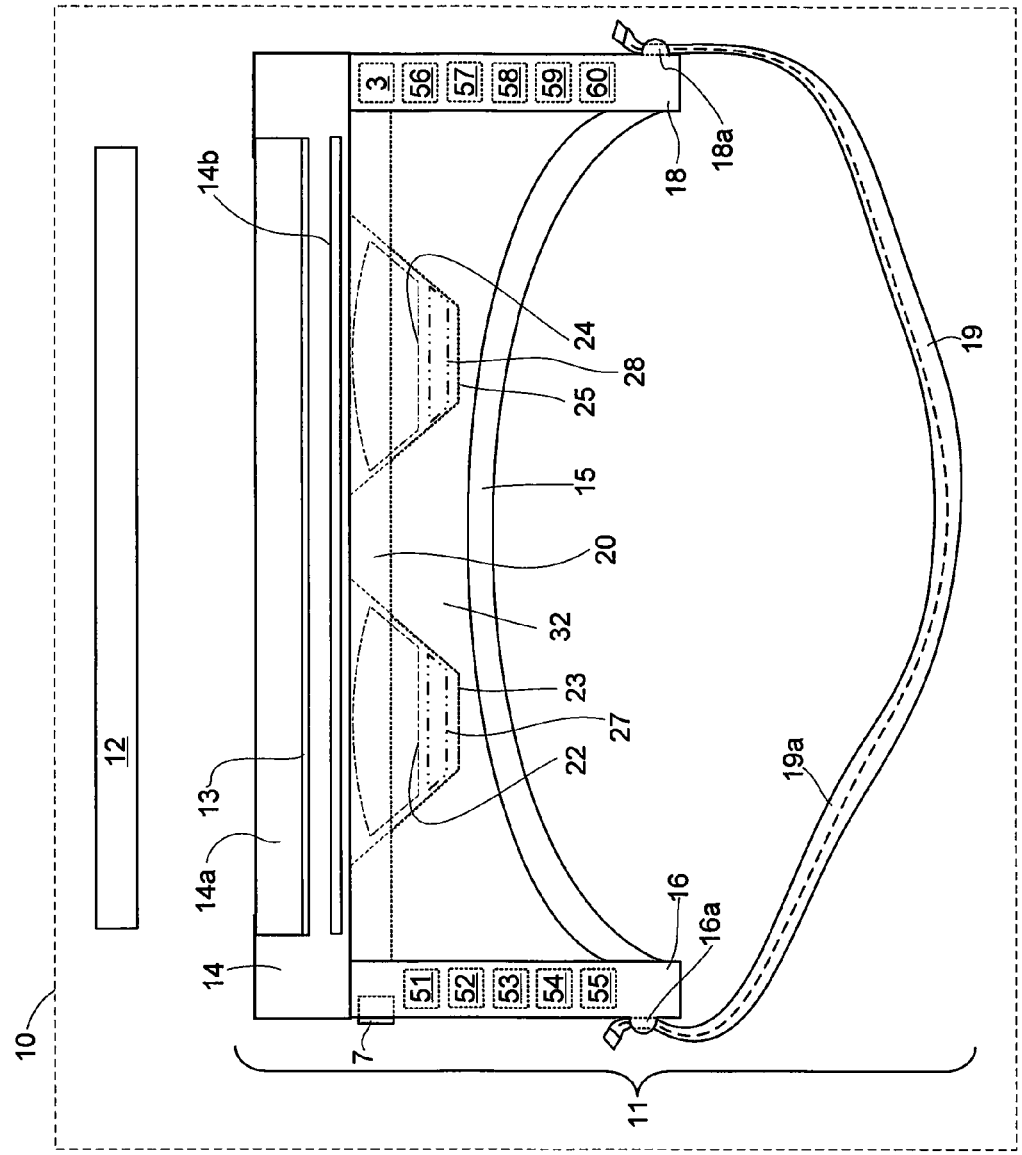
FIG. 13 is a top schematic view of a second embodiment of a virtual reality headset system of the present invention.

Mobile device case 12 preferably comprises a sleek design that cooperates with base 14 and can be comfortably carried by the user when not being used with the VR headset 11. Case 12 is configured such that it does not need to be removed from the user's mobile device to use the mobile device with headset 11 and such that it directly attached to or fits in the dock of base 14. Case 12 can be made from a variety of materials including but not limited to plastic, carbon fiber, and rubber. Case 12 can be a solid color or it can incorporate designs, patterns, or themes. For example, case 12 can be a solid orange color or it could have an image or feature of a popular video game displayed on it. Case 12 preferably includes ports, buttons, or openings to accommodate the camera, buttons, charging ports, and other features of the mobile device. Case 12 preferably is sized and configured such that when positioned in or cooperating with base 14 no light will pass into the field of view of the viewer when using the VR headset system 10. Case 12 can be one component as shown in FIG. 13 or multiple components as the case components 12a and 12b shown in FIG. 14.

Figure 15:
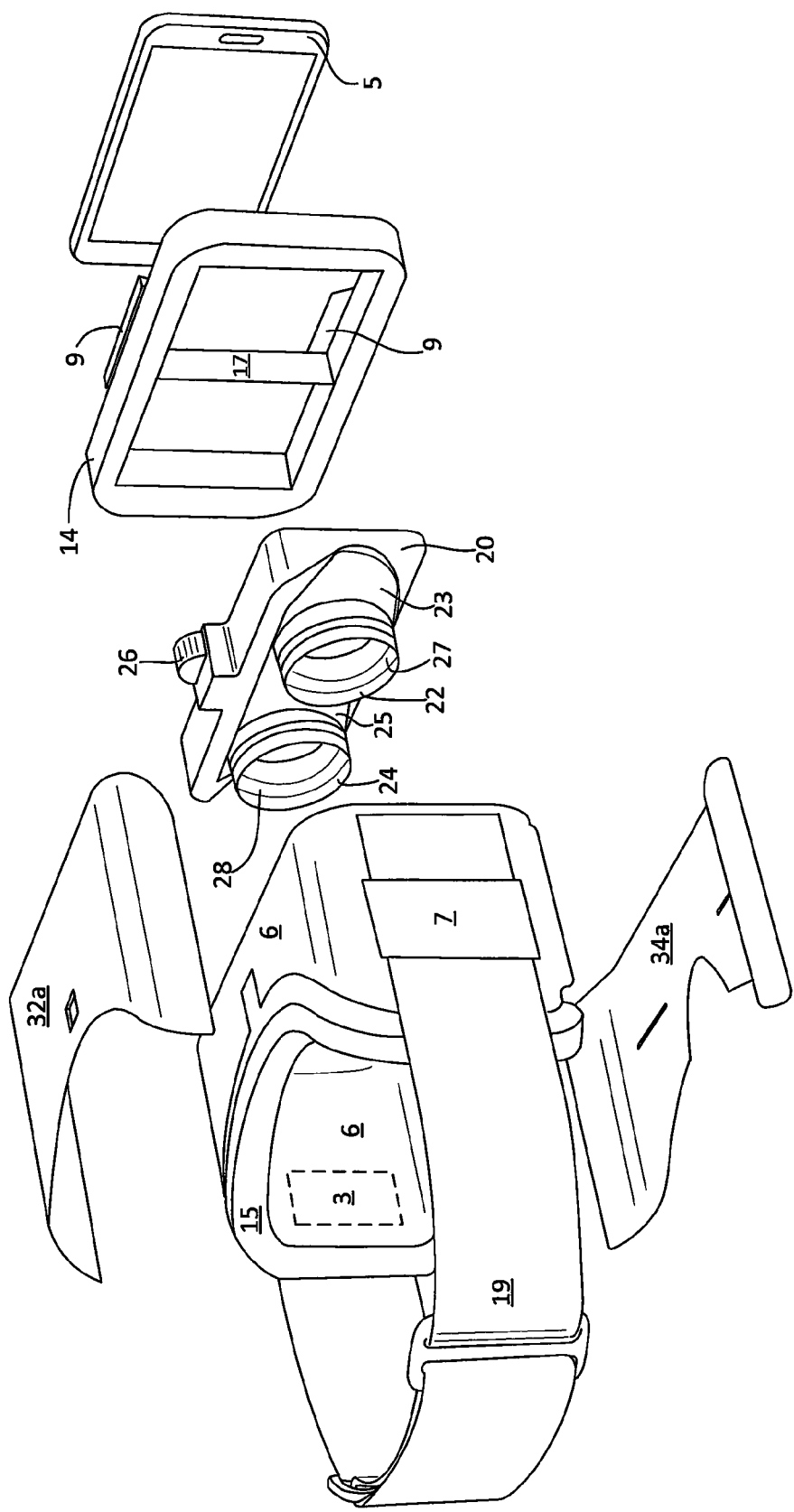
FIG. 15 is a perspective exploded view of a fourth embodiment of the virtual reality headset of the present invention.

Support module 6 of headset 11 is the frame or support into which a user places his head and face. In one embodiment, support module 6 comprises at least one or more of the following components: first wall 16, second wall 18, upper wall 32, lower wall 34, corners 36, edges 38, and covers 32a and 34a. As shown in FIG. 14, first and second side walls attach to optional upper wall 32 and lower wall 34 at corners 36 to create a substantially continuous surface or wall. First and second side walls and upper and lower walls can be four separate components directly connected or connected with corners 36. Alternatively, the walls 16, 18, 32, and 24 and corners 36 can be integrally formed as one component as shown in FIG. 15, and can further include covers such as first cover 32a and second cover 34a shown in FIG. 15. Where the walls are separate components, first and second side walls 16 and 18 and upper and lower walls 32 and 34 are preferably changeable and removably attach to base 14. First and second side walls 16 and 18, upper and lower walls 32 and 34, and optional corners 36 can be attached to base 14 with snaps, hook & loop connectors, tongue and groove connectors, magnets, latches, adhesive, screws, or any other method of temporarily and securely two components together as is well known in the art. One or more edges 38 can optionally attach to walls 16, 18, 32 and 34 and corners 36 at the opposite end from base 14 as shown in FIG. 14. Edges 38 allow a user to further customize his headset 11. Side walls 16 and 18, upper and lower walls 32 and 34, corners 36, and edges 38 are preferably configured to block light from entering headset 11 when in use. First and second covers 32a and 34a attach to one or more of walls 16, 18, 32 and 34 or to corners 36 or edges 38 with fasteners or by snapping into place with a pressure fit. Covers 32a and 34a preferably define openings (not labelled) where necessary to allow a user to access controls or ports or to allow access to other components of the headset.

Lower wall 34 of support module 6 optionally includes a nose piece or defines a cutout to accommodate a nose piece as shown in FIG. 14, and one or more walls preferably include physical features for accommodating a cooperating strap 19. For example, side walls 16 and 18 may each include a slot 16a and 18a respectively, through which a strap 19 can be attached or snaps to which a strap can attach. Additionally, slots 16a and 18a can include pushbutton locks or lace locks to facilitate adjustability, or they may be configured as multiple slots that allow the strap to be adjusted or held stationary depending on how the strap is looped through the multiple slots. Other methods of facilitating strap adjustability can be substituted without changing the scope of the present invention.

Additionally, side walls 16 and 18, upper and lower walls 32 and 34, corners 36, edges 38, and covers 32a and 34a are available in a variety of sizes, shapes, and colors to allow the user to customize the fit, the use, and the look of the headset. As with base 14, first and second side walls 16 and 18, upper and lower walls 32 and 34, corners 36, edges 38, and covers 32a and 34a preferably comprise substantially rigid or semi-rigid materials capable of securing the weight of the base 14 and mobile device and/or case 12 with which it cooperates. Walls 16, 18, 32, and 34, corners 36, edges 38, and covers 32a and 34a can be a solid color or can incorporate designs or patterns, and preferably are available in a variety of colors, designs, and patterns to accommodate the specific tastes of the user.

An alternate and preferred configuration of support module 6 is shown in FIGS. 19-21 and 22-23. As shown, support module 6 comprises an outer wall 61 and an inner wall 64. Outer wall 61 comprises a substantially continuous structure or shell that defines upper and lower walls and opposing side walls. Additionally, outer wall 61 comprises a first surface 63 that can accept additional modules such as a comfort module 15. The side walls of outer wall 61 form side extensions 62 and define generally opposing openings or holes 62a through which attachment devices such as a plug, key, or insert 72 can be inserted. Inner wall 62 comprises a substantially continuous structure or shell that defines an upper wall, a lower wall, and opposing side walls. Additionally inner wall 64 comprises a first surface 66 that cooperates with and optionally physically attaches to device module 4 or lens module 8. The side walls of inner wall 64 define side extensions 65 that are sized and shaped to cooperate with extensions on the device module 4 and the lens module 8. Preferably, side extensions 65 are configured as indentations in the substantially continuous wall 64. The side extensions 65 of inner wall 64 further define generally opposing openings or holes 65a through which attachment devices such as a plug, key, or insert 72 can be inserted. Together, complementary inner wall side extension 65 and outer wall side extension 62 cooperate to form a support module extension, and there can be multiple support module extensions located at various locations of the support module. Preferably inner wall 64 snugly fits inside of outer wall 64, and when inner wall 64 is positioned within outer wall 61, holes 65a and 62a are configured so that they align. Inner wall 64 can be retained within outer wall 61 either by pressure or a snug fit or it can be attached with screws, adhesive, magnets, or other types of fasteners.

Lens module 8 preferably comprises a lens plate 20, lens cups 23 and 25, lenses 22 and 24, a first shutter 27, a second shutter 28, and at least one lens adjuster 26. Lens plate 20 is a support or plate that defines two openings (not labeled). Each of the openings defined by plate 20 accommodates lens cups 23 and 25. Lens cups 23 and 25 snap into lens plate 20 with detents, pins, extensions, or flanges 23a and 25a as shown in FIGS. 16 and 18, for example, or push screw into place such that lens cups 23 and 25 can be easily removed and changed as needed. Alternatively, other methods of fastening two objects together can be used as is known in the art. The openings in lens plate 20 or the lens cups 23 and 25 can optionally be adjusted so that the openings are closer together or further apart. Additionally, lens cups 23 and 25 can be moved, or lens plate 20 further facilitates adjusting the openings, such that they can be moved higher or lower with respect to a user's eyes or closer or further from a user's eyes. Moreover, each lens cup can be adjusted independently of the other lens cup. Lens adjuster 26 facilitates adjustment of the lens cups or openings in the lens plate. As shown in the Figures, lens adjuster 26 is an adjuster knob or screw that when rotated causes the lens cups and openings to move in a predetermined direction. Only one lens adjuster 26 is shown in the Figures but several can be included to control movement of the lenses, lens cups, or openings as desired and as will be understood by someone skilled in the art.

Additionally, lens plate 20 can be configured to position lenses 22 and 24 at a specific distance from dock 14a and the mobile device display. For example, a flange can be located around the circumference of lens plate 20 to control depth. Alternatively, fasteners for securing lens module 8 to support module 6 can attach at different locations along support module 6. Lens plate 20 can be available in a variety of shapes in order to accommodate different user's requirements as to what distance the user desires between lenses 22 and 24 and the mobile device display.

Lens module 8 and lens plate 20 removably secure to either device module 4 or support module 6 or both. Lens module 8 and lens plate 20 can be removably secured to support module 6 and/or device module 4 with snaps, hook & loop closure, tongue and groove fasteners, magnets, latches, adhesive, screws, or any other method of temporarily and securely two components together as is well known in the art. For example, lens module 8 and lens plate 20 can be pressure fit into base 14 of device module 4 or attached to the first and second side walls 16 and 18 of support module 6 with interlocking tongues and grooves. Lens module 8 and lens plate 20 preferably comprises substantially rigid or semi-rigid materials capable of securing the weight of two lenses and lens cups.

FIGS. 19-27 illustrate a preferred method of removably securing lens module 8 to device module 4 and support module 6 wherein modules 4, 6, and 8 comprise extensions defining openings and holes. Support module 6 comprises an extension or complementary extensions such side extension 62 and extension or extension indent 65 that can receive the extensions of modules 4 and 8. Additionally, the extensions of modules 4, 6, and 8 nest together. When nested, the holes of the extensions and extension indents substantially align to receive a plug, key, or insert 72. When the plug 72 is placed through the aligned holes, the modules are securely attached together. The extensions of the lens module 8 are shown in the Figures as lens module extensions 29. The extensions of the device module 4 are shown in the figures as device module extensions 45. The extensions of the support module 6 are shown in the Figures as wall extension 62 and wall extension 65. Preferably, support module extension or complementary extensions receive the device module extensions such that the device module extension is nested in the support module extension or complementary extensions, and device module extensions receive the lens module extensions such that the lens module extensions is nested in the device module extension.

First and second lens cups 23 and 25 are shaped and configured to house first and second lenses 22 and 24. Preferably, two separate lenses and corresponding lens cups are present, however the same features apply if only one lens and lens cup is required without altering the scope of the invention. Generally, lenses 22 and 24 comprise acrylic, glass, or polymers and are preferably removably secured, or optionally permanently secured, within lens cups 23 and 25. Lenses 22 and 24 also may comprise aspheric lenses, achromatic lenses, plano-convex (PCX) lenses, double-convex (DCX) lenses, hybrid fused lenses, lenses made with metamaterials, lenses with a negative refractive index, or lenses with an air gap or space between its elements. Lenses 22 and 24 can be a single lens or can be a cooperating series of lenses. For example, preferably, lenses 22 and 24 comprises a triple lens series as shown in FIG. 18, each of which comprises a proximal lens 22a or 24a, a middle lens 22b or 24b, and a distal lens 22c or 24c. More preferably, first proximal lenses 22a and 24a are glass, middle lenses 22b or 24b are glass, and distal lenses 22c or 24c are plastic.

Additionally, an air gap is defined between distal lenses 22c and 24c and middle lenses 22b and 24b. Optionally, first and second shutters 27 and 28 can be positioned between the lenses in the series as shown in FIGS. 16 and 18. Lenses 22 and 24 and lens cups 23 and 25 are oriented with respect to the lens plate 20 and base 14 as shown in FIG. 13. Further, lens cups preferably comprise a truncated conical shape or funnel shape as shown in FIG. 13. The preferred shape of lens cups 23 and 25 limits the view of the user when viewing the display on the mobile device so that the user does not see the entire mobile device display. Lens cups 23 and 25 preferably twist and lock into the lens plate 20 or can be pressure fit or snapped into place. Alternatively, lens cups 23 and 25 can be otherwise removably secured to lens plate 20 as will be known to someone skilled in the art such that they remain rigidly and securely attached an oriented with respect to lens plate 20. Lens cups 23 and 25 may additional comprise integral or attached eye cups 23b and 25b that are positioned at the end of lens cups 23 and 25 near where a user rests his eyes as shown in FIGS. 16 and 18 to provide a comfortable fit and further to adjust to the contours of the user's face near his eyes.

Figure 19:
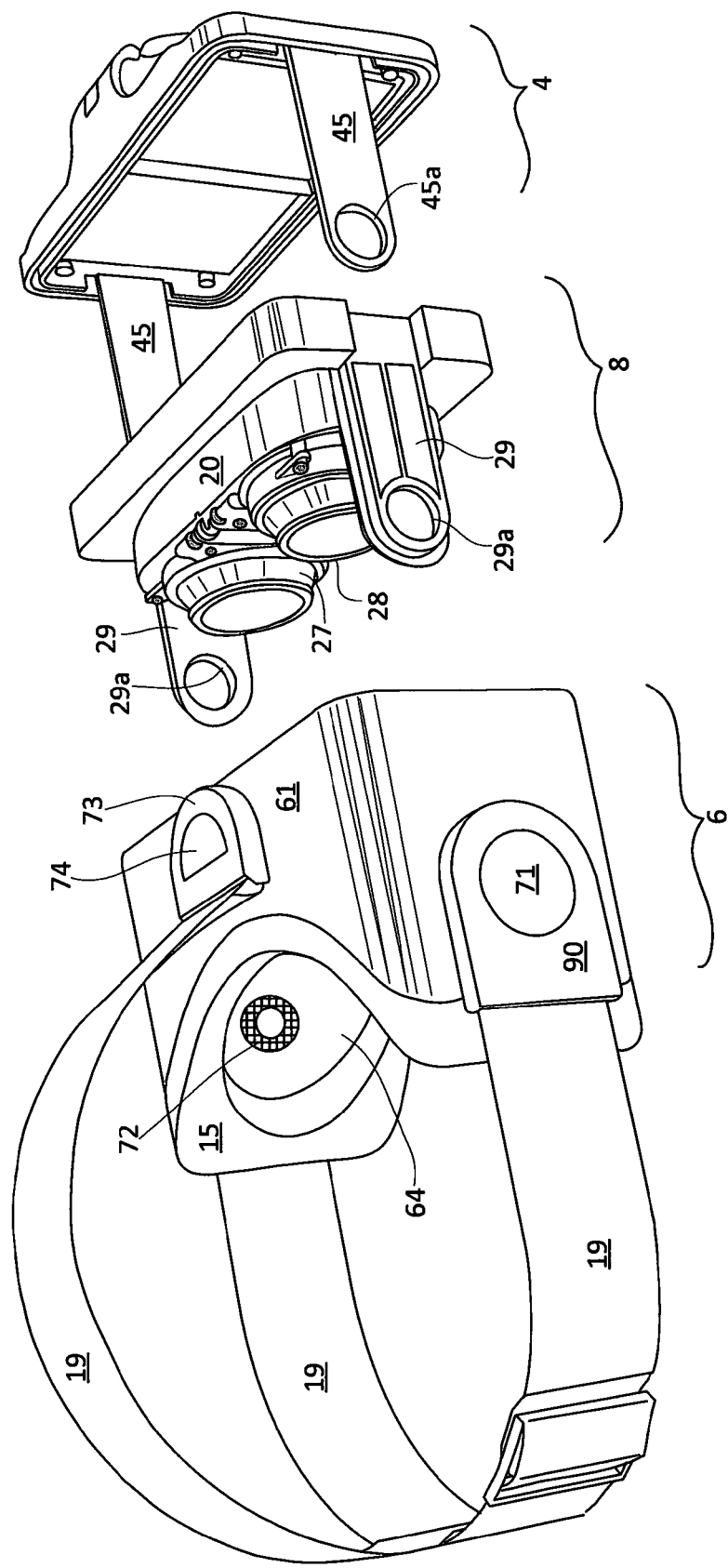
FIG. 19 is a perspective partial exploded view of a fifth embodiment of the virtual reality headset of the present invention.
Figure 20:
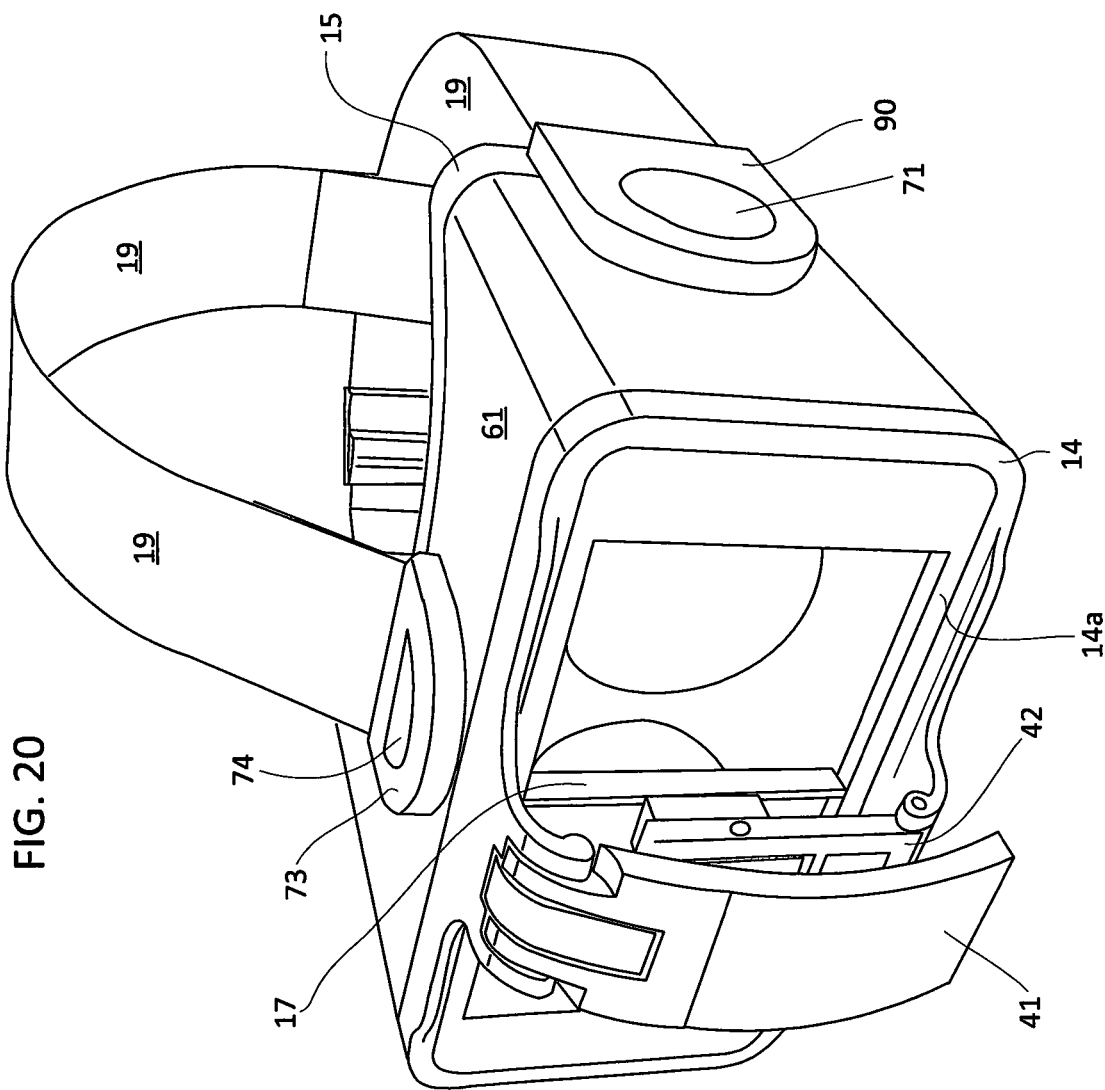
FIG. 20 is a perspective view of the fifth embodiment of the virtual reality headset of the present invention.

Shutters 27 and 28 as shown with the various embodiments of modular and convertible VR headset system 10 can be configured as a single screen that can be inserted between the lenses and the mobile device display or they can be separate physical structures that attach directly to each lens as shown in FIGS. 19-21 and such that it is positioned between a user's eye and the lens when in use. Alternatively, shutters 27 and 28 can be positioned between a first and second lens component of a multi-part lens for each eye. Shutters 27 and 28 can snap, screw, clip, or adhere to adjacent components and preferably connects to a battery or power source positioned on or in headset 11 as needed. Alternatively, the shutters can be powered from the output of the universal serial bus (USB) of the mobile device or by a power source for the headset. Shutters 27 and 28 also directly or wirelessly connect with headset control and processing components 3 where software is stored in memory and executed by the components to actively operate shutters 27 and 28.

While it is desired that lens plate 20, lens cups 23 and 25, lenses 22 and 24, and shutters 27 and 28 be modular and upgradeable, a variety of lens plates 20 can be provided with permanently secured lens cups, lenses and shutters without altering the scope and purpose of the present invention. Additionally, lens plate 20 and lens cups 23 and 25 can be one component or can be an integral support or framework for lenses 22 and 24. For example, lens plate 20 can be a frame in which lens cups 23 and 25 are positioned so that they can translate in various directions including horizontally and vertically.

Figure 23:
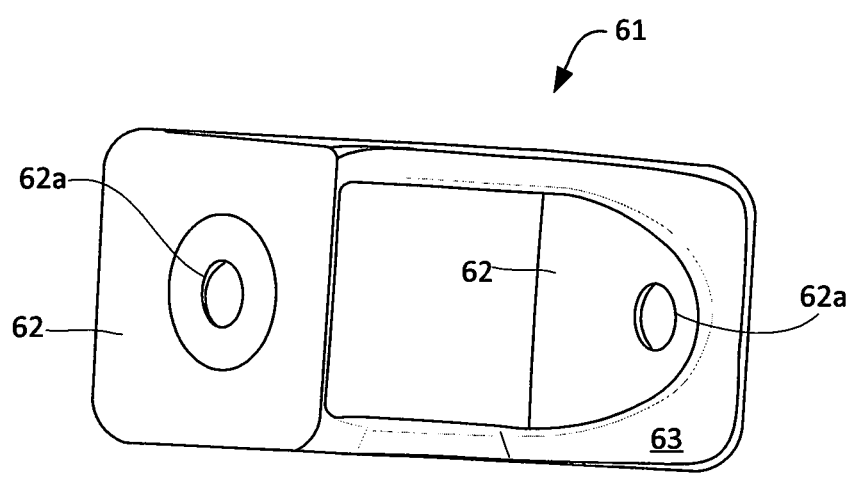
FIG. 23 is a perspective view of the outer shell of the support module of the fifth embodiment of the virtual reality headset of the present invention.

Comfort module 15 is optional and removably attaches to and between first and second side walls 16 and 18 as shown in FIG. 13 or along the edge of support module 6 as shown in FIGS. 14-5 and 7-9. It is positioned such that it fits between the user's face and support module 6 or lens module 8 when the user wears headset 11 to make the user more comfortable and to improve the fit of the headset. In one embodiment, comfort module 15 attaches directly to surface 63 of outer wall 61 of support module 6 as shown in FIG. 23. Comfort module 15 comprises foam or other resilient material that allows it to mold to the user's face when in use. Other resilient materials include but are not limited to microfiber, hypoallergenic materials, memory foam, and cool memory foam. Comfort module 15 can be removably secured to support module 6 with snaps, hook & loop closure, latches, adhesive, screws, or any other method of temporarily and securely two components together as is well known in the art. Alternatively, it can be permanently affixed or adhered to support module 6 if desired. Comfort module 15 can also be available in a variety of colors and patterns to allow the user to customize his headset as desired.

Strap 19 comprises adjustable strap material for securing the headset to the user's head by extending from first side wall 16 around the back of the user's head to second side wall 18 as shown in FIG. 13 or for extending between opposite sides of support module 6. Strap material is well known in the art. Strap 19 also is preferably adjustable and available in a variety of colors and patterns to allow the user to customize his headset as desired. Strap 19 optionally comprises a channel 19a for accommodating wires for headset 11 components or for independent components. For example, strap 19 may accommodate headphone components for the user's convenience and to enhance the VR experience when using the VR headset system 10. Alternatively, strap 19 can house audio or other components including headphone wires, battery packs, or wires for connecting to other components.

Strap 19 preferably removably secures to side walls 16 and 18 as shown in FIGS. 13-16 or at the sides of outer wall 61 and optionally the top of outer wall 61 as shown in FIGS. 19-21. Also, as shown in FIGS. 19-21, strap 19 can also include a section that extends up and over a user's head. For example, strap 19 can be looped through slots in side walls 16 and 18 and optionally to upper wall 32 or attach with cooperating snaps to side walls 16 and 18 and optionally upper wall 32. In a preferred embodiment, as shown in FIGS. 19-27, strap 19 attaches to the sides and upper surface of outer wall 61 with locking connectors 90 that are configured to cooperate with nesting extensions of the device, support, and lens modules and plug 72. In some embodiments, a modified locking connector 73 can be used that further includes a power button 74 or other input device as shown in FIGS. 19-21. Modified locking connector 73 can be identical to locking connector 90 or it can be fixedly attached to the support module 6, device module 4, or lens module 8.

Figure 27:
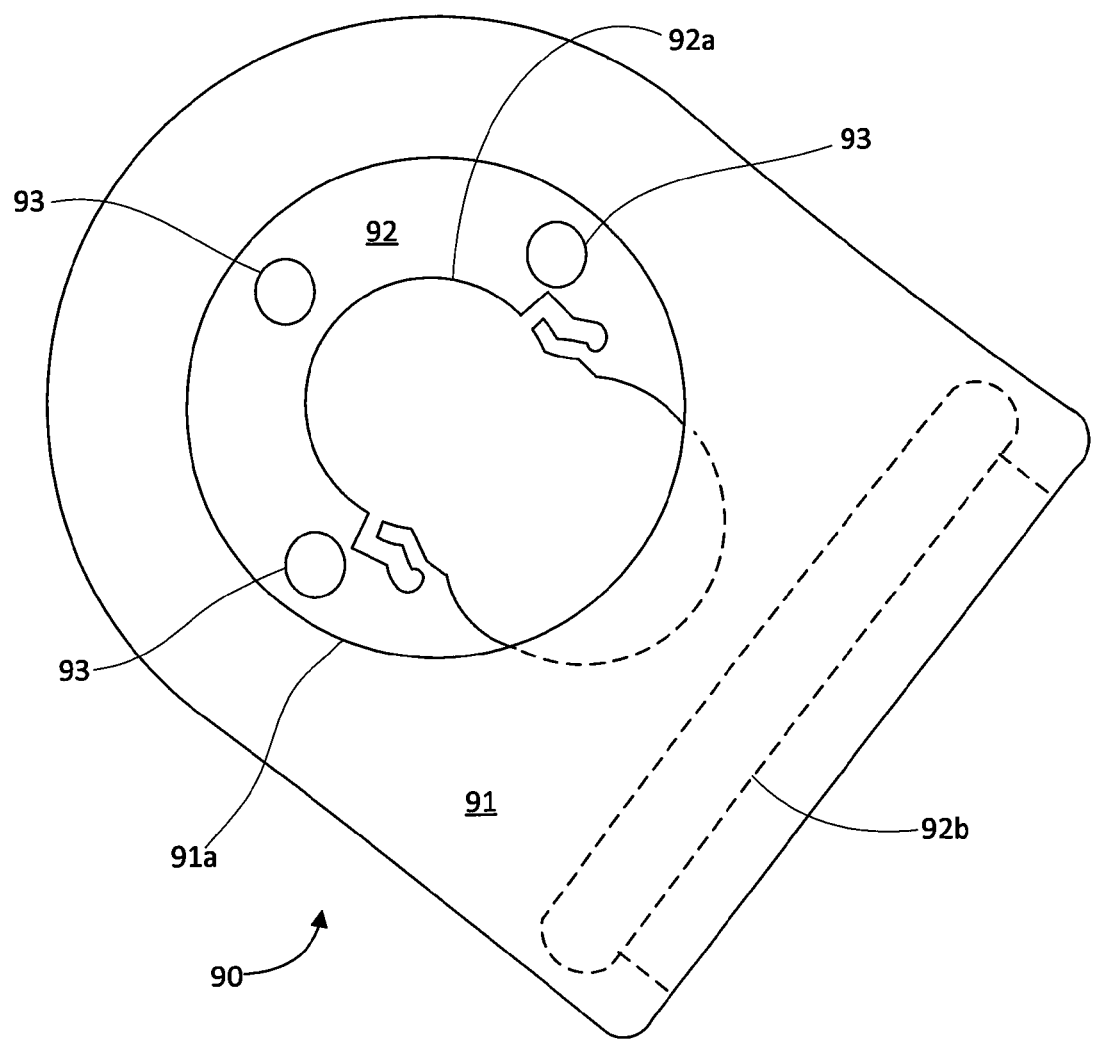
FIG. 27 is a perspective view of an embodiment of a strap connector for use with the virtual reality headset of the present invention.

FIG. 27 illustrates a preferred connector 90 having an upper surface 91 and a cooperating lower surface 92. The perimeters of upper surface 91 and lower surface 92 align and define a space between them. Upper surface 91 defines an opening 91a for receiving a removable cover 71. Removable cover 71 snaps into receivers 93 on lower surface 92. Lower surface 92 defines a first opening 92a shaped like a beetle or multiple adjacent circular holes with notches and a second opening shaped to receive an end of strap 19. First opening 92a receives plug 72 and can be adjusted while plug 72 is positioned in it such that connector 90 can slide and lock into place after plug 72 is inserted. The preferred design of connector 90 allows a user to easily take apart the modules by removing cover 71, sliding connector 90 to allow access to plug 72, and then removing plug 72. Moreover, when a user wants to assemble the module device, the user simply nests device and lens module extensions 45 and 29 in complementary support module extensions 65 and 62 so that the holes 45a, 29a, 65a, and 62a all align. The user then positions connector 90 over the aligned holes, inserts plug 72, slides connector 90 until it locks in place, and then optionally places cover 71 in opening 91a, and optionally secures it in place by placing snap extensions (not shown) into receivers 93.

VR headset 11 also preferably includes control and processing components 3. Control and processing components 3 preferably include a processor, memory, and wireless or wired communication components as is well known in the art. Wireless communications components include NFC components and longer range communications components to facilitate communication with the user's mobile device and to facilitate communication with software and content located remotely or accessible only via the Internet. Wired communication components include components configured to interact with a port or connection on the mobile device so that there is a direct wired connection between the mobile device and the control and processing components in the headset. Additionally, software can be stored on the memory and executable by the processor to permit the user to communicate and interact with his mobile device while using the headset. Additional software can be stored on the memory and executable by the processor to permit only authorized access by the user, to convert the display of the mobile device into a stereoscopic display, to view two-dimensional content as three-dimensional content, and to operate shutters 27 and 28. Further, mobile devices may alternatively store software as either content added after production of the mobile device or as part of the protected layer of firmware for the mobile device that can be remotely accessed by the control and processing components of the VR headset 11 through the headset's NFC or other wireless communication methods or by direct connection or electrical communication between the mobile device and headset 11 such as with a USB connection.

VR headset 11 is modular and customizable to satisfy the user's personal aesthetic preferences and also to optimize the VR experience. To optimize the VR experience, one or more of the walls 16, 18, 32, 34, 61 and/or 64, lens plate 20, lens cups 23 and 25, lenses 22 and 24, comfort module 15, and strap 19 are all selected and configured according to several factors specific to the user's head shape and size, the user's mobile device, and the type of programming to be enjoyed with the headset 11. In particular, the walls 16, 18, 32, 34, 61 and/or 64 and lens module 8 components will be optimized according to the mobile device screen size, the mobile device screen resolution, the mobile device DPI, and the type of programming being accessed, such as a video or an interactive game. For example, higher resolution mobile devices allow for the lenses to be physically closer to the mobile device screen, which then makes the experience more immersive and also requires a lens plate 20 and at least side walls 16 and 18 to be selected such that the lenses 22 and 24 are closer to the mobile device display. Conversely, lower resolution mobile devices are better enjoyed with lenses that are further away from the mobile device display. Accordingly, the lens plate 20 and at least side walls 16 and 18 should be selected such that the lenses 22 and 24 are the appropriate distance from the mobile device display. The lenses and other components may also be selected based on the particular user's preference and vision.

Additional features and components can also be included with the VR headset system 10 either as permanent features and components or as modular and removable features and components. For example, VR headset system 10 can further include a microphone 51, headphones 52, or both that physically attach to or are housed within headset 11 and cooperate and communicate with headset 11, the attached mobile device, or both. Microphone 51 and headphones 52 are preferably attached to or housed within device module 4 or support module 6.

VR headset 11 may further include motion detection sensors 53, head tracking technology 54 and/or eye movement tracking technology 55 such as accelerometers, gyroscopes, integrated depth sensors, computer vision technology, lasers, light detection and ranging (LiDAR) technology, and Wi-Fi triangulation technology. Hand movement sensors or trackers or other body movement sensors or tracker may also communicate electronically or wirelessly with cooperative technology 56 included in headset 11, the attached mobile device, or both. The motion sensors and tracking technology may also communicate with other technology outside of the headset 11 and attached mobile device. Sensors 53, head tracking technology 54, and eye movement tracking technology are preferably attached to or housed within one or more of device module 4, support module 6, or lens module 8. Alternatively, they can be housed separately from headset 11 and in electrical or wireless communication with components of headset 11. Additionally, VR headset 11 may have impute or ports for attaching third party accelerometers or motion detection or other sensors that cooperate with headset 11.

VR headset 11 optionally may comprise a camera 57 and additional displays 58 such as an integrated, permanently attached, or removably attached external display that displays to non-users the content or a simplified version of the content being experienced by the user, which may be particularly useful as a parental control feature. Additionally or alternatively, an integral, permanently attached, or removably attached a display may be included within the view of the user so he can view additional programming or the output of one or more attached or wirelessly connected cameras 57. Cameras 57 can be a video camera for either or both recording what the wearer is experiencing or what is actually occurring in his surroundings. Additionally, camera 57 may physically or wirelessly communicate and cooperate with mobile device 5 and split the content or enhance the existing camera on the attached mobile device. Camera 57 and displays 58 are preferably integral with or attached to or housed within device module 4 or support module 6.

VR headset 11 also optionally and preferably may comprises buttons, toggles, joysticks, touchpads, or other input devices 7 for operating the settings of the headset itself or for making selections in the software being accessed with the headset and by the user. While the input devices are shown in FIG. 14 as being attached to or housed with support module 6, they could also optionally be attached to or housed in device module 4 without altering the scope of the invention. The input devices 7 may also be used to control the typical input devices of the mobile device. For example, if a user was wearing headset 11 and received a call on his mobile device, he could use an input device on headset 11 to answer the call on his mobile device without having to remove the mobile device from headset 11.

VR headset 11 optionally may also include technology that allows for hands free use of the headset 11 and the user's mobile device. Preferably, such technology uses voice recognition components such as a microphone and code or software that is either stored on the memory and executable by the processor of the VR headset 11 or stored remotely and accessed wirelessly to allow hands free use of either or both of the headset and mobile device. Additionally, such technology can comprise Bluetooth® technology, wireless sensor networks, advanced network tools (ANT+), wireless home digital interface technology (WHDI), or other local area wireless technologies such as Wi-Fi. Further, VR headset 11 may optionally include technology that permits access to stored financial information and usernames and passwords to facilitate purchases and game, Website, and application access. Preferably, such technology uses NFC components and code or software that is either stored on the memory and executable by the processor of the VR headset 11 or stored remotely and accessed wirelessly to only allow access to financial information, usernames, and passwords, when the user's mobile device is physically located in or attached to base 14. Also preferably, when the mobile device is removed from base 14, access to financial information, usernames, and passwords is prevented.

Additional features may be included with the VR headset system 10 that provide warnings to user when components are not operating appropriately, when the user's mobile device is not connected properly, or when potential safety issues are present. Such warnings may comprise audible warnings, vibrations, or other warning signals. Additionally, such warnings can comprise proximity sensor or an augmented reality overlay with warnings from the actual camera of the VR headset 11 or of the cooperating mobile device.

VR headset 11 may also include a rechargeable battery 60 preferably housed within device module 4 or support module 6 or as a detachable battery pack that can located on the headset 11 or worn on the user and in electrical communication with headset 11. Additionally, it may include a battery charger for charging the attached mobile device to extend its battery life. VR headset 11 may also further include components to reduce the user's exposure to electromagnetic radiation such as shields, dissipation assemblies, dissipation antennas or the like.

To use the VR headset system 10 of the present invention, for one embodiment, the user preferably selects a case 12 that cooperates with his mobile device 5. For both embodiments, the user also preferably selects his desired components for the headset system 10 based on his aesthetic preferences, his desired use, and his mobile device. After selecting the components and assembling and optimizing his headset 11, the user inserts his mobile device 5 or mobile device 5 and case 12 into the dock or receptacle 14a formed by base 14 and optionally locks it in place with lock 9. Once locked in place, with the control and processing components 3 positioned in the headset 11, an application, code, or software stored locally or stored remotely and accessed wirelessly, is activated to place the mobile device in a three-dimensional mode where the mobile device display is split into side by side stereoscopic displays. Additionally or alternatively, headset 11 can access other applications, code, or software stored remotely and accessed wirelessly or stored locally to immediately allow mobile device to operate in a 3D mode. Additionally, if authorization or security protocols are desired that permit access to financial information, usernames, and passwords only when the user's mobile device is present in headset 11, then using software stored locally or stored remotely and accessed wirelessly, the stored information is immediately accessible. While wearing headset 11 with an attached mobile device, the user can then use any features present such as hands-free components, input devices, a microphone, headphones, a video-camera, a heads-up display, or another feature. All features are available until the user removes his mobile device and case 12 from base 14. Once the mobile device and case 12 are removed, headset 11 ceases communication with the mobile device and optionally turns off.

While there has been illustrated and described what is at present considered to be the preferred embodiment of the present invention, it will be understood by those skilled in the art that various changes and modifications may be made and equivalents may be substituted for elements thereof without departing from the true scope of the invention disclosed, but that the invention will include all embodiments falling within the scope of the claims.

We claim:

1. A modular virtual reality headset system with a motion blur reduction system that can be customized and assembled by a user comprising:
    a. a frame assembly comprising two or more cooperating removable and interchangeable components;
    b. a dock defined by the frame assembly and configured to receive a mobile device;
    c. a lens module configured to removably attach to the frame assembly, wherein the lens module comprises one or more removable and interchangeable lenses; and
    d. an active shutter system configured to removably attach to the frame assembly such that it is positioned between the user's eyes and the dock when the headset system is in use.

2. The modular virtual reality headset system of claim 1 wherein the frame assembly comprises a device module configured to removably attach to a support module, and wherein the dock is defined by the device module.

3. The modular virtual reality headset system of claim 2 wherein the support module comprises one or more interchangeable walls, and wherein the walls removably attach to the device module.

4. The modular virtual reality headset system of claim 1 wherein the active shutter system removably attaches directly to the device module such that the shutter system is positioned between the lens module and the dock.

5. The modular virtual reality headset system of claim 4 wherein the active shutter system comprises at least two independent shutter segments.

6. The modular virtual reality headset system of claim 4 wherein the active shutter system comprises first and second shutters.

7. The modular virtual reality headset system of claim 6 wherein the first shutter comprises at least two independent shutter segments, and wherein the second shutter comprises at least two independent shutter segments.

8. The modular virtual reality headset system of claim 1 further comprising control and processing components housed in the frame assembly, and one or more input devices housed in the frame assembly wherein the control and processing components are configured to at least communicate with the active shutter system and to receive input from the user.

9. The modular virtual reality headset system of claim 8 further comprising communication components housed in the frame assembly and configured to communicate with at least the mobile device positioned in the dock of the frame assembly.

10. The modular virtual reality headset of claim 8 further comprising an optical sensor attached to the frame assembly and positioned to detect optical changes on a display of the cooperating mobile device, wherein the control and processing components are further configured to receive data from the optical sensor.

11. The modular virtual reality headset system of claim 8 further comprising communication components housed in the frame assembly and configured to communicate with at least the mobile device positioned in the dock of the frame assembly.

12. The modular virtual reality headset system of claim 1 wherein the active shutter system comprises two or more cooperative and optically aligned active shutter systems.

13. The modular virtual reality headset system of claim 1 wherein the active shutter system comprises first and second shutters, wherein the lens module comprises first and second lenses, wherein the first shutter removably attaches to and is optically aligned with the first lens, and wherein the second shutter removably attaches to and is optically aligned with the second lens.

14. The modular virtual reality headset system of claim 13 wherein the first shutter comprises at least two independent shutter segments, and wherein the second shutter comprises at least two independent shutter segments.

15. The modular virtual reality headset system of claim 13 wherein the first shutter comprises a single shutter segment, and wherein the second shutter comprises a single shutter segments.

16. The modular virtual reality headset system of claim 13 wherein the first shutter comprises at least two cooperative and optically aligned first shutters, and wherein the second shutter comprises at least two cooperative and optically aligned second shutters.

17. The modular virtual reality headset system of claim 13 further comprising control and processing components housed in the frame assembly, and one or more input devices housed in the frame assembly wherein the control and processing components are configured to at least communicate with the active shutter system and to receive input from the user.

18. The modular virtual reality headset system of claim 1 wherein the active shutter system comprises first and second shutters, wherein the lens module comprises first and second lenses, wherein the first shutter removably attaches to and is optically aligned with the first lens, and wherein the second shutter removably attaches to and is optically aligned with the second lens.

19. A modular virtual reality headset system with a motion blur reduction system comprising:

a. a frame assembly capable of being customized and assembled by a user, wherein the frame assembly comprises a support module, a device module defining a dock and configured to receive a mobile device and to removably attach to the support module, and a lens module configured to removably attach to the support module and the device module, wherein the lens module comprises at least one lens removably attached to a lens plate;

b. an active shutter system configured to removably attach to the frame assembly such that it is positioned between the user's eyes and the dock when the headset system is in use;

c. control and processing components housed in the frame assembly configured to communicate at least with the active shutter system;

d. wireless communication components housed in the frame assembly and in communication with the control and processing components, wherein the wireless communication components are further configured to wirelessly communicate with at least the mobile device positioned in the dock of the frame assembly;

e. one or more locks for securing the mobile device in the dock of the frame assembly; and f. one or more straps removably attached to the frame assembly.

20. The modular virtual reality headset system of claim 19 wherein the active shutter system removably attaches directly to the device module such that the shutter system is positioned between the lens module and the dock.

* * * * *